United States Patent
Chang et al.

[11] Patent Number: 6,122,144
[45] Date of Patent: Sep. 19, 2000

[54] CONTOURED POLE TIP STRUCTURES FOR MINIMIZING SIDE TRACK ERASURE

[75] Inventors: Thomas Young Chang, San Jose; David Eugene Heim, Redwood City; Edward Hinpong Lee, San Jose, all of Calif.

[73] Assignee: International Business Machines Corporation, Armonk, N.Y.

[21] Appl. No.: 08/995,890

[22] Filed: Dec. 22, 1997

[51] Int. Cl.[7] .................................................. G11B 5/187
[52] U.S. Cl. .......................... 360/122; 360/113; 360/126
[58] Field of Search .................................. 360/113, 119, 360/122, 126

[56] References Cited

U.S. PATENT DOCUMENTS

| | | | |
|---|---|---|---|
| 5,719,730 | 2/1998 | Chang et al. | 360/113 |
| 5,726,841 | 3/1998 | Tong et al. | 360/122 |
| 5,801,910 | 9/1998 | Mallary | 360/126 |

FOREIGN PATENT DOCUMENTS

| | | |
|---|---|---|
| 6-267023 | 9/1994 | Japan . |
| 8-287414 | 11/1996 | Japan . |

*Primary Examiner*—William Klimowicz
*Attorney, Agent, or Firm*—Gray Cary Ware & Freidenrich LLP; Ervin F. Johnston

[57] ABSTRACT

A write head is provided that has an "I" shaped pole tip structure. Flux leakage between bottom corners of a top horizontal component to a bottom horizontal component of the "I" shaped pole tip structure is obviated by rounding or tapering the side edges of the top horizontal component as it recesses into the head from the ABS. The angle taken by each recessed side edge with respect to the ABS edge is less than 90° so that flux concentrations at the corners are minimized and flux leakage from these corners to the bottom horizontal component is substantially eliminated. In another embodiment of the invention the top horizontal component is configured with a necked down portion between front and rear portions for minimizing flux saturation of other pole tip components.

32 Claims, 17 Drawing Sheets

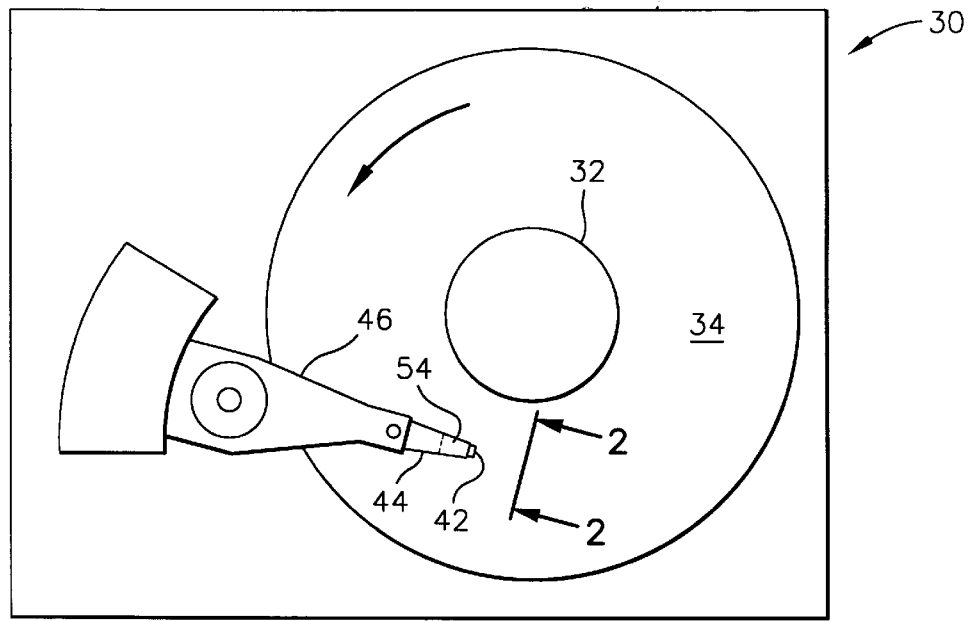
FIG. 1
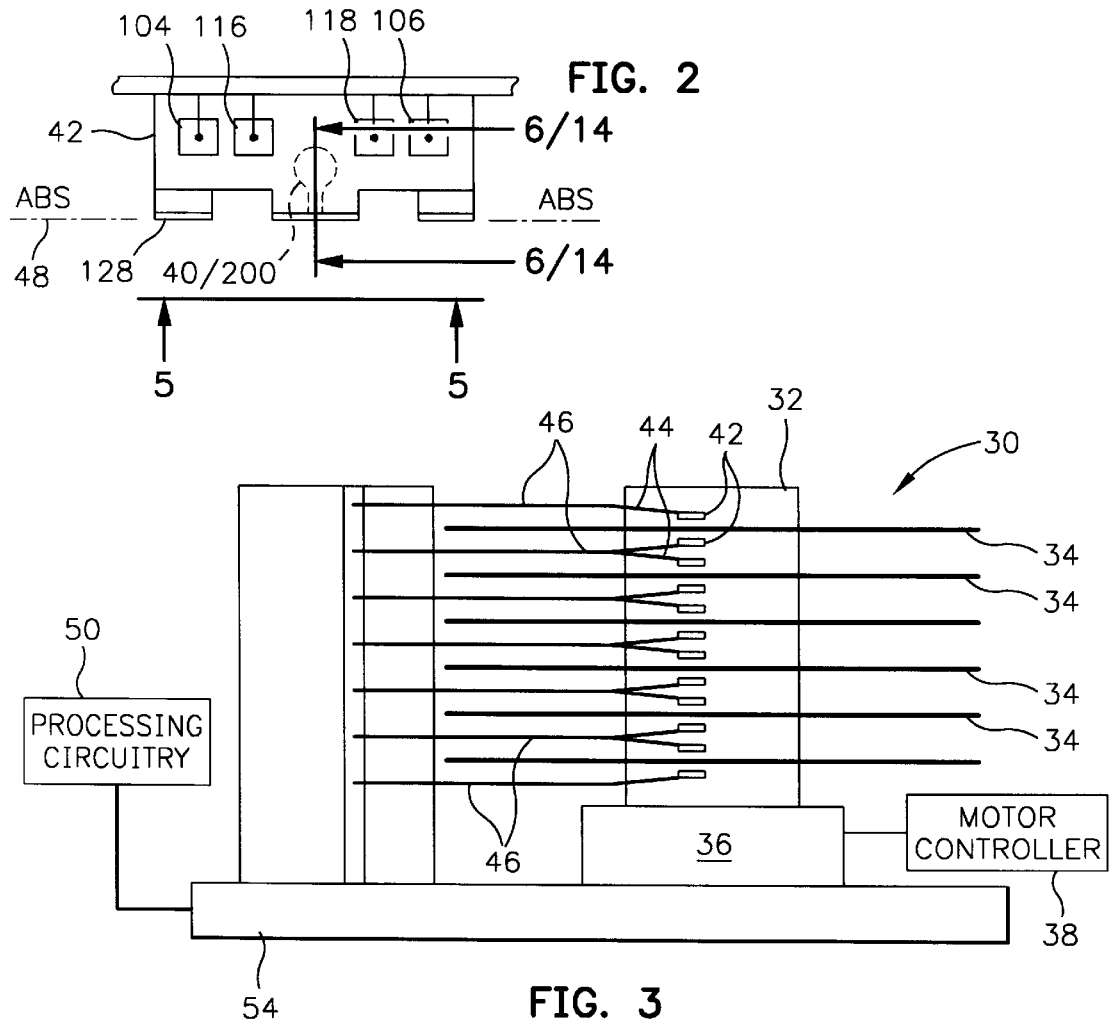
FIG. 2
FIG. 3

(ROTATED 90°)

(ROTATED 90°)

CONTOURED POLE TIP STRUCTURES FOR MINIMIZING SIDE TRACK ERASURE

BACKGROUND OF THE INVENTION

1. Field of the Invention

The present invention relates to a contoured pole tip structure for minimizing side track erasure and more particularly to an "I" shaped pole tip structure of a write head wherein side edges of the top portion of the "I" structure are rounded or beveled immediately adjacent an air bearing surface so that flux leakage from bottom corners of the top portion of the "I" structure to a bottom portion of the "I" structure is minimized.

2. Description of the Related Art

An inductive write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head. The pole piece layers are connected at a back gap. Currents are conducted through the coil layer, which produce magnetic fields in the pole pieces. The magnetic fields fringe across the gap at the ABS for the purpose of writing information in tracks on moving media, such as in circular tracks on a rotating magnetic disk or longitudinal tracks on a moving magnetic tape.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the second pole tip, shortening the second pole tip will increase the flux reaching the recording media. Therefore, performance can be optimized by aggressively placing the flare point close to the ABS.

Another parameter important in the design of a write head is the location of the zero throat height (ZTH). The zero throat height is the location where the first and second pole pieces first separate from one another after the ABS. ZTH separation is imposed by an insulation layer, typically the first insulation layer in the insulation stack. Flux leakage between the first and second pole pieces is minimized by locating the ZTH as close as possible to the ABS.

Unfortunately, the aforementioned design parameters require a tradeoff in the fabrication of the second pole tip. The second pole tip should be well-defined in order to produce well-defined written tracks on the rotating disk. Poor definition of the second pole tip may result in overwriting of adjacent tracks. A well-defined second pole tip should have parallel planar side walls which are perpendicular to the ABS. In most write heads the second pole tip is formed along with the yoke after the formation of the first insulation layer, the coil layer and the second and third insulation layers. Each insulation layer includes a hardbaked photoresist having a sloping front surface.

After construction, the first, second and third insulation layers present front sloping surfaces which face the ABS. The ZTH defining insulation layer rises from a plane normal to the ABS at an angle (apex angle) to the plane. The sloping surfaces of the hard-baked resist of the insulation layers exhibit a high optical reflectivity. When the second pole tip and yoke are constructed, a thick layer of photoresist is spun on top of the insulation layers and photo patterned to shape the second pole tip, using the conventional photo-lithography technique. In the photo-lithography step, ultraviolet light is directed vertically through slits in an opaque mask, exposing areas of the photoresist which are to be removed by a subsequent development step. One of the areas to be removed is the area where the second pole piece (pole tip and yoke) are to be formed by plating. Unfortunately, when the location of the flare point is placed on the sloping surfaces of the insulation layers, ultraviolet light is reflected forward, toward the ABS, into photoresist areas at the sides of the second pole tip region. After development, the side walls of the photoresist extend outwardly from the ultraviolet pattern, causing the pole tip to be poorly formed after plating. This is called "reflective notching". As stated hereinabove this causes overwriting of adjacent tracks on a rotating disk. It should be evident that, if the flare point is recessed far enough into the head, the effect of reflective notching would be reduced or eliminated since it would occur behind the sloping surfaces. However, this solution produces a long second pole tip which quickly reduces the amount of flux reaching the recording medium.

The high profile of the insulation stack causes another problem when the photoresist is spun on a wafer. The thickness of the resist in the pole tip region is excessively high. During the light exposure step the light progressively scatters like light in a body of water causing poor resolution during the light exposure step.

A scheme for minimizing the reflective notching and poor resolution problems is to employ a write head with an "I" shaped pole tip structure. In an exemplary prior art "I" shaped pole tip structure the first pole tip comprises the bottom horizontal component of the "I" and the second pole tip, which is "T" shaped, comprises the vertical component and the top horizontal component of the "I". The vertical component is constructed before the insulation layers to eliminate the reflective notching problem. After forming the first pole piece layer (bottom horizontal component) and the write gap layer, a photoresist layer is spun on the partially completed head for constructing the vertical component. The photoresist layer is very flat so that ultraviolet light from the photo-patterning step is not reflected forward. After plating the vertical component of the second pole tip the photoresist layer is removed and the first insulation layer, the coil layer and the second and third insulation layers are formed. The horizontal component of the second pole tip is then stitched (connected) to the vertical component. Since the second pole tip is well-formed, well-formed notches can be made in the first pole piece.

With the prior art "T" shaped second pole tip the ZTH is dependent upon the location of the recessed end of the vertical component. Since the vertical component has to be long enough to provide a sufficient stitching area for the horizontal component, this length may result in undesirable flux leakage between the first and second pole pieces. Another problem that has been observed with all "I" shaped pole tip structures is that flux fringes between the bottom corners of the top horizontal component and the bottom horizontal component, causing adjacent tracks to be overwritten.

SUMMARY OF THE INVENTION

Another "I" shaped pole structure for obviating the reflective notching problem is an inverted write head. An inverted head differs from the aforementioned prior art write head in that the first pole tip comprises the vertical and bottom horizontal components and the second pole tip comprises the top horizontal component. With this arrangement the vertical component of the first pole tip defines the track width of the head. In the inverted write head the ZTH is defined by an upward slope of the second pole piece, thereby overcoming the aforementioned stitching area problem associated with the aforementioned prior art "I" shaped pole tip structure.

Since the vertical component of the first pole tip defines the track width the aforementioned reflective notching problem is overcome. The horizontal and vertical components of the first pole piece are constructed before construction of the insulation stack, thereby obviating light reflection into the pole tip region. The horizontal component of the first pole tip is a flat layer. The vertical component of the first pole tip is also a flat layer that is constructed on the horizontal component. Accordingly, photoresist photo-patterning produces a thin photoresist layer for the mask which provides good resolution. Since the second pole tip is constructed subsequent to the insulation stack, light will be reflected into the second pole tip during its construction. This is not a problem because the second pole tip does not define the track width of the head. However, since the inverted head has an "I" shaped pole tip structure there is flux leakage between the horizontal components of the "I" shaped pole tip structure, as discussed hereinabove.

We have observed that there is a high concentration of flux (flux density) at the bottom corners of the top horizontal component due to the typical 90° corners that the top horizontal component makes with the ABS as it recesses into the head. We have found that, by changing the contour of the side edges of the top horizontal component, flux density at the corners can be reduced and flux transfer between the corners of the top horizontal component and the bottom horizontal component is substantially eliminated. We accomplish this by making the side edges either rounded or tapered. In any event the angle that a side edge takes with respect to the ABS is less than 90°. With this arrangement the width of the top horizontal component progressively increases from the ABS along at least a portion of the length of the top horizontal component toward the back gap. In a further embodiment of the invention a hammerhead shaped second pole piece layer is provided which has the aforementioned rounded or tapered corners. The hammerhead embodiment has an intermediate second pole piece portion that has a reduced cross section for limiting the amount of flux to the ABS.

An object of the present invention is to provide an inverted magnetic write head that has substantially no unwanted flux leakage between pole tips at the ABS of the head.

Another object is to provide an inverted magnetic write head that does not erase tracks adjacent to the track being written.

A further object is to provide an "I" shaped pole tip structure wherein the top horizontal component of the "I" is contoured to minimize flux transfer between a bottom corner of the top horizontal component and a bottom horizontal component of the "I" shaped pole tip structure.

Still another object is to provide an inverted magnetic write head that has a uniquely configured pole tip structure for eliminating flux leakage between top and bottom portions of the pole tip structure.

Still a further object of the present invention is to provide a method of making an inverted magnetic write head that has substantially no unwanted flux leakage between pole tips at the ABS of the head.

Still another object is to provide a method of making an inverted magnetic write head that does not erase tracks adjacent to the track being written.

Still a further object is to provide a method of making a magnetic head of the type that has a first pole piece with a track writing narrow second layer on a wide first layer and an intermediate width second pole piece layer that has contoured corners for preventing flux leakage from the second pole piece layer to the first layer at the ABS.

Still another object is to provide a method of making an inverted magnetic write head that has a second pole piece with uniquely contoured side edges for eliminating flux leakage from the second pole piece layer to a wider first pole piece layer at the ABS.

Other objects and advantages of the invention will be appreciated upon reading the following detailed description of the invention taken together with the accompanying drawings.

BRIEF DESCRIPTION OF THE DRAWINGS

FIG. 1 is a planar view of an exemplary magnetic disk drive;

FIG. 2 is an end view of a slider with a magnetic head of the disk drive as seen in plane 2—2;

FIG. 3 is an elevation view of the magnetic disk drive wherein multiple disks and magnetic heads are employed;

DESCRIPTION OF THE PREFERRED EMBODIMENTS

Magnetic Disk Drive

Figure 4:
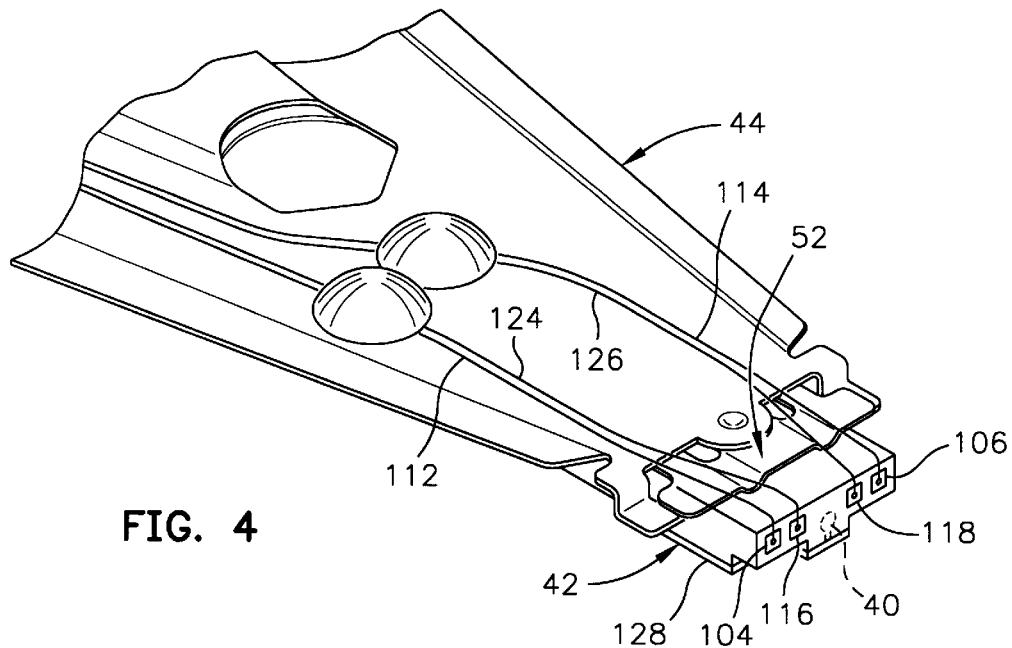
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a head gimbal assembly (HGA) 52 which, in turn, is mounted to the suspension 44. The components described hereinabove may be mounted on a frame 54, as shown in FIG. 3.

Figure 5:
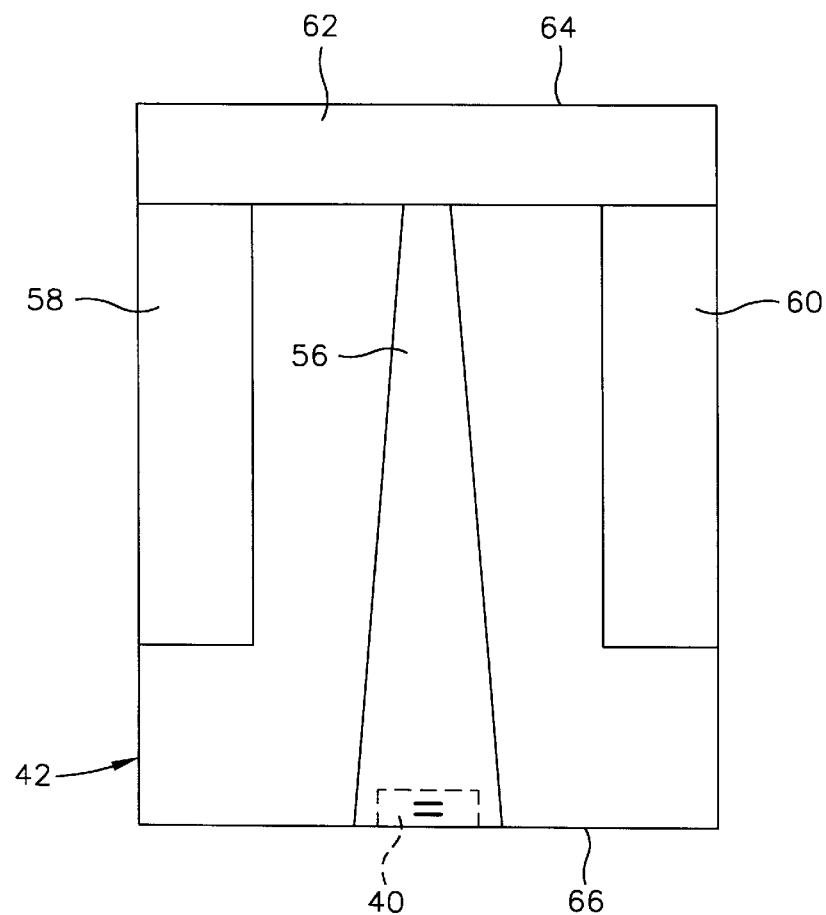
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
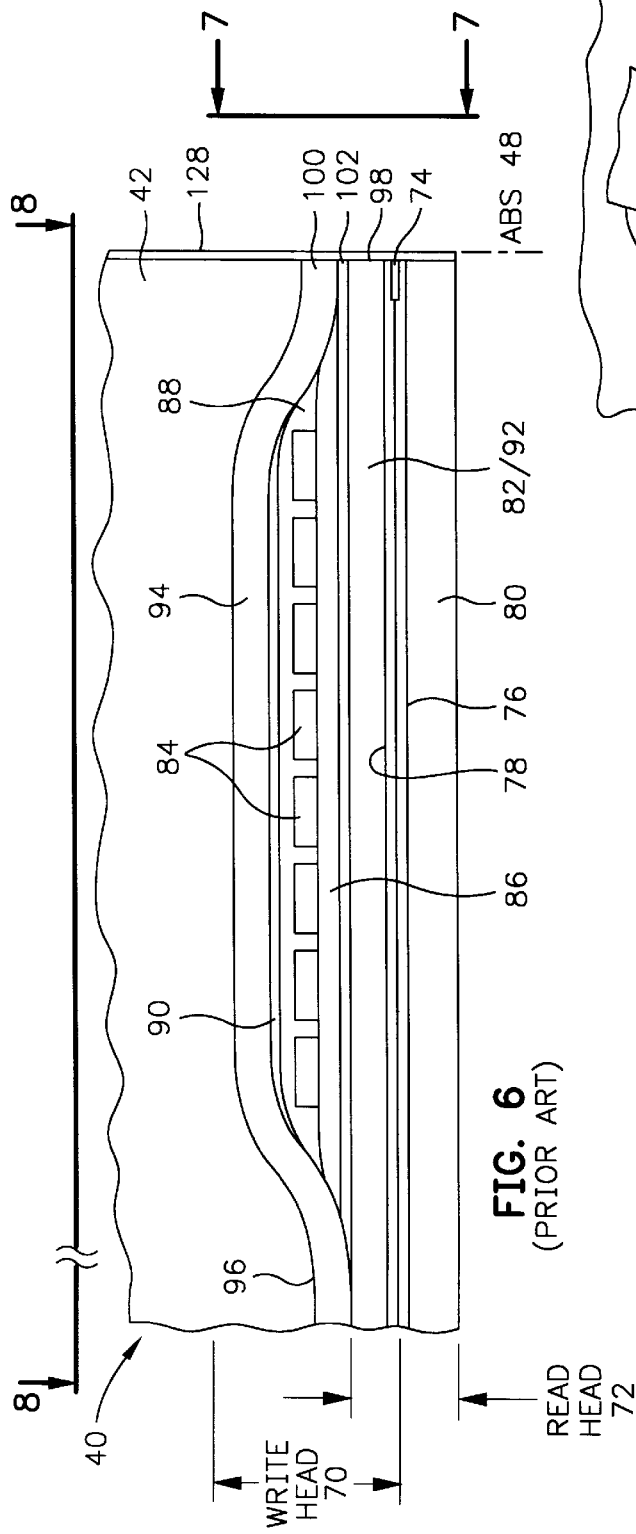
FIG. 6 is a partial view of the slider and a prior art magnetic head as seen in plane 6—6 of FIG. 2.
Figure 7:
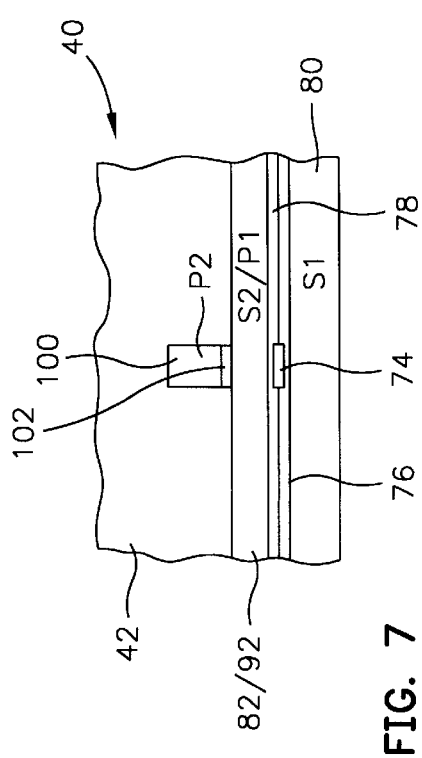
FIG. 7 is a partial ABS view of the slider taken along plane 7—7 of FIG. 6 to show the read and write elements of the prior art magnetic head.

FIG. 6 is a side cross-sectional elevation view of the merged MR head 40 which has a write head portion 70 and a read head portion 72, the read head portion employing an MR sensor 74. FIG. 7 is an ABS view of FIG. 6. The sensor 74 is sandwiched between first and second gap layers 76 and 78 and the gap layers are sandwiched between first and second shield layers 80 and 82. In response to external magnetic fields, the resistance of the sensor 74 changes. A sense current $I_s$ conducted through the sensor causes these resistance changes to be manifested as potential changes. These potential changes are then processed as readback signals by the processing circuitry 50 shown in FIG. 3.

Figure 8:
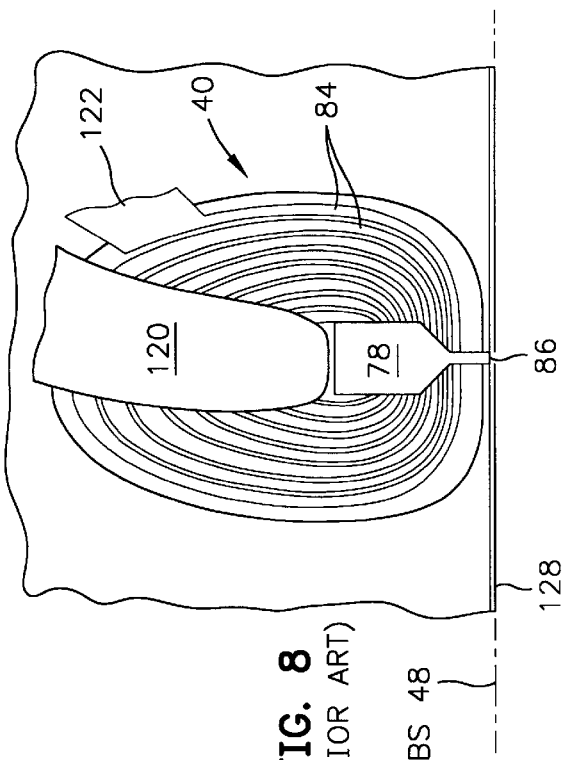
FIG. 8 is a view taken along plane 8—8 of FIG. 6 with all material above the second pole piece removed.

The write head portion of the merged MR head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7. It should be noted that the merged MR head 50 employs a single layer 82/92 to serve a double function as a second shield layer for the read head and as a first pole piece for the write head. A piggyback MR head employs two separate layers for these functions.

Prior Art Magnetic Write Head

Figure 9:
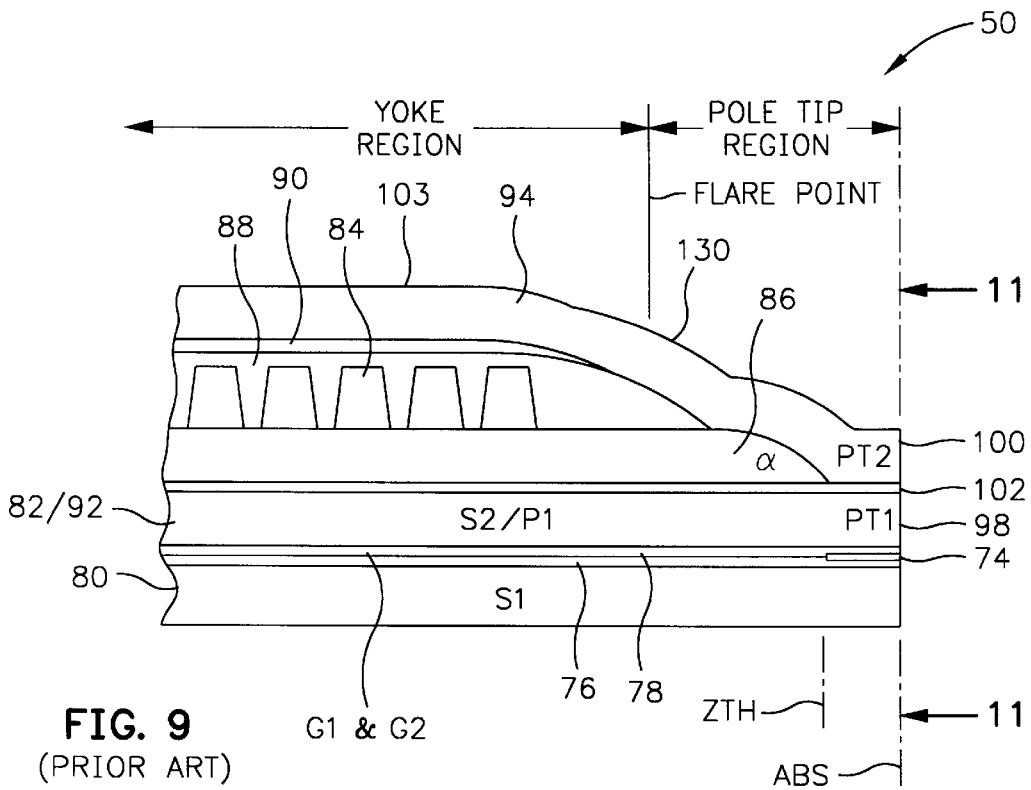
FIG. 9 is an enlarged front portion of the prior art magnetic head of FIG. 6 to show various details thereof.
Figure 12:
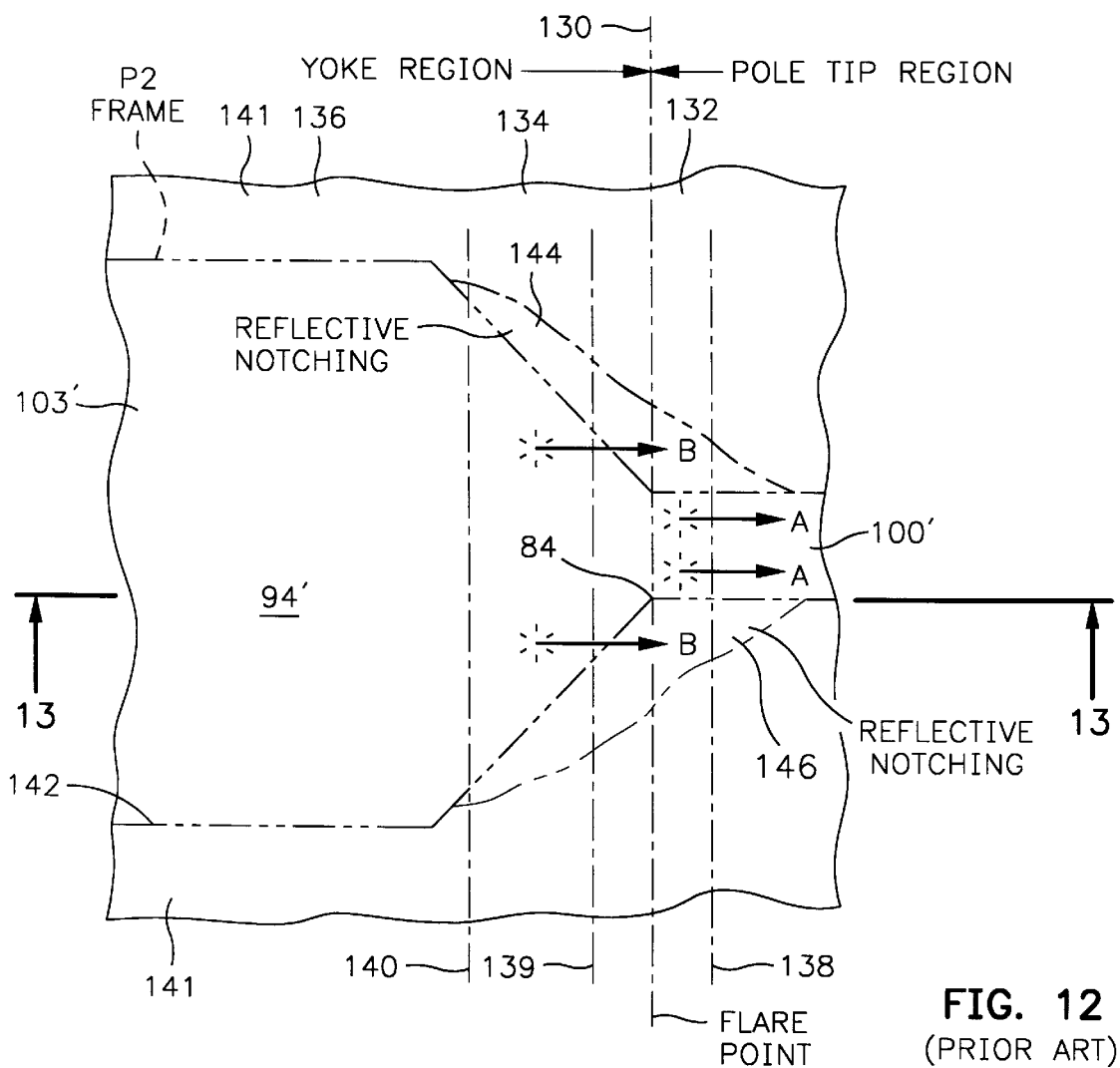
FIG. 12 is a view taken along plane 12—12 of FIG. 10.

As shown in FIG. 9, the second pole piece layer 94 has a pole tip region and a yoke region, the merging of these components being defined by a flare point 130 which is the location where the second pole piece layer 94 begins to widen as it recesses in the head. The second pole tip region extends from the ABS to the flare point 130, and the yoke region extends from the flare point 130 to the back gap 96 (see FIG. 6). In FIG. 12 are shown the pole tip region, the yoke region and the flare point 130 as defined by a photoresist mask (P2 frame).

Figure 13:
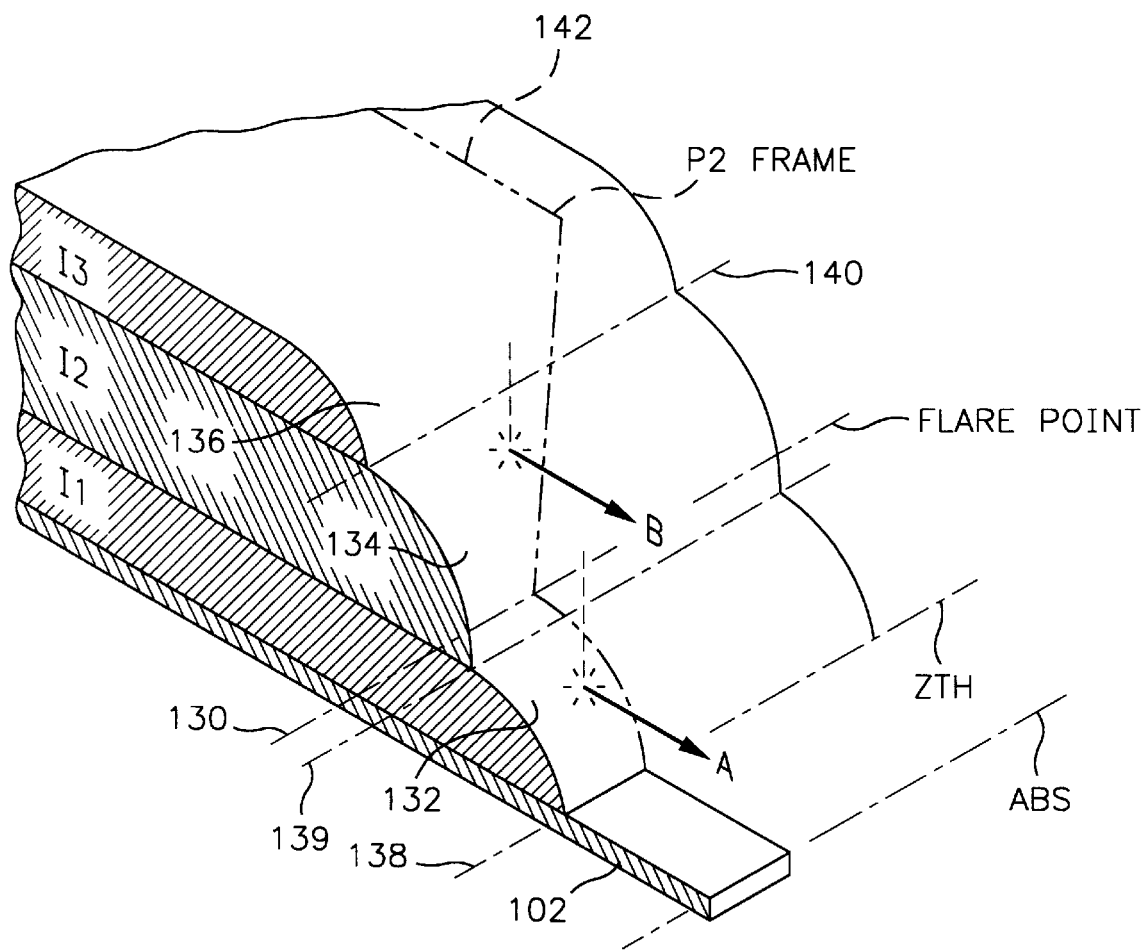
FIG. 13 is an isometric illustration of FIG. 10 without the P2 photoresist.

The location of the flare point 130, shown in FIGS. 9, 12 and 13, is an important design parameter of the write head. The further the flare point is recessed into the head, the longer the pole tip 100, which increases magnetic inductance and the likelihood that the pole tip 100 will saturate in response to flux from the coil layer 84. In the past it has been difficult to locate the flare point closer to the ABS than 10 μm because of a fabrication problem in making the second pole tip.

Another important design parameter in making the write head is the location of a zero throat height (ZTH), which is where the first and second pole piece layers 92 and 94 first separate from one another behind the ABS. It is important to locate the ZTH as close as possible to the ABS (typically within about 1 μm) in order to reduce the flux loss between the pole pieces before the fields reach the gap layer 102 at the ABS. In the prior art, locating the ZTH close to the ABS contributed to the aforementioned problem of fabricating a well-defined second pole tip 100.

Figure 10:
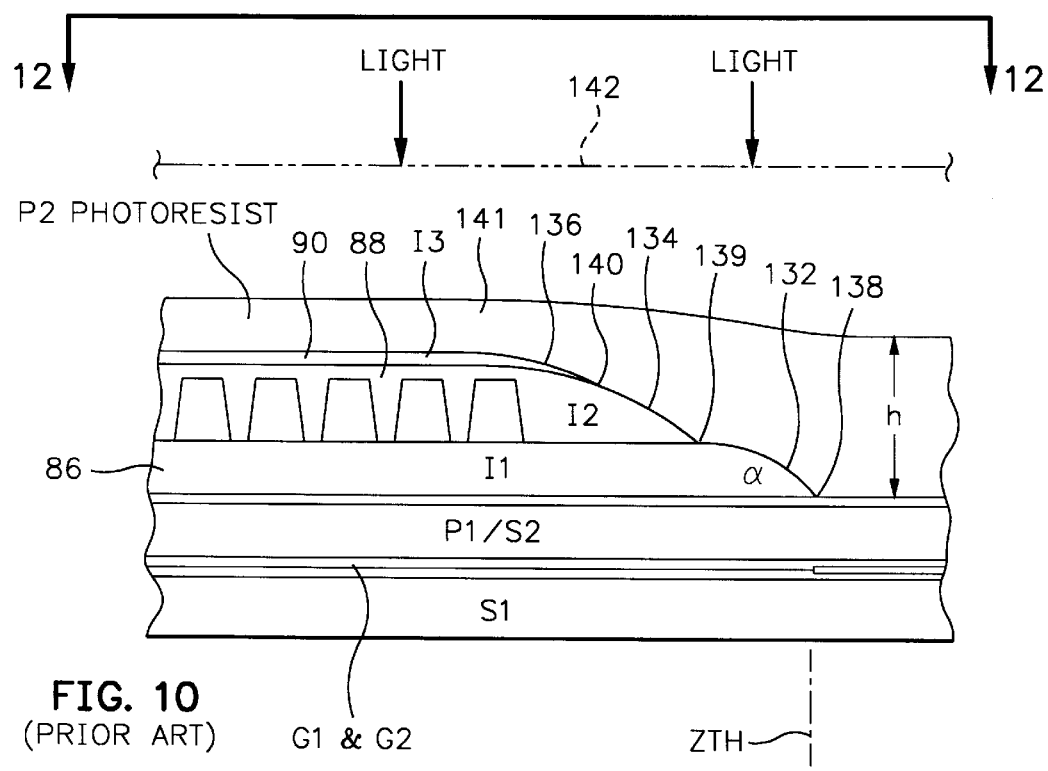
FIG. 10 is the same as FIG. 9 except a photo-patterning step is illustrated for constructing the second pole tip of the magnetic head.

FIG. 10 shows the prior art head of FIG. 9 during the step of constructing the second pole piece 94 (see FIG. 9). In FIG. 10 the first, second and third insulation layers 86, 88 and 90 are shown with sloping surfaces 132, 134 and 136 respectively, which terminate at apexes 138, 139 and 140 respectively. As stated hereinabove, the first, second and third insulation layers are hard-baked photoresist which results in the sloping surfaces 132, 134 and 136 being highly reflective to light. All of the sloping surfaces 132, 134 and 136 face the pole tip region where the second pole tip 100 of the second pole piece 94 is to be formed. As shown in FIG. 10, the second pole piece is formed with a photoresist layer 141 that is spun on top of the partially completed head. The height of the photoresist layer may be as much as 12 $\mu$m thick in the pole tip region and is typically approximately 4.5 $\mu$m thick above the third insulation layer 90. Since the flare point 130 of the second pole piece 94 (shown in FIGS. 9, 12 and 13) is located on the sloping surfaces of the insulation layers, light directed through a second pole-shaped opening (not shown) in a mask 142 will be reflected from the sloping surfaces forward toward the ABS into areas of the photoresist layer 141 adjacent the pole tip region. This causes the pole tip region to be wider than the opening in the mask 142. This is referred to as "reflective notching" and is illustrated in FIG. 12.

The photoresist pattern for the second pole piece is shown at 94' in FIG. 12 and which comprises the pole tip pattern 100' and the yoke pattern 103'. This is referred to as the "P2 frame". Reflective notching of the photoresist layer 141 by light reflected at an angle of incidence from the sloping layers of the insulation layers is shown at 144 and 146. When light ray A is directed downwardly during the photo-imaging step of the photoresist, it is reflected at an angle of incidence into the pole tip region without causing any reflective notching of the second pole tip. However, light ray B from the photo-imaging process is reflected from the sloping surfaces of the insulation layers behind the flare point 130 at an angle of incidence into the photoresist 141 into a side region outside the intended pole tip pattern 100'. It is light reflection B and similar light reflections that cause the reflective notching shown in FIG. 12.

Figure 11:
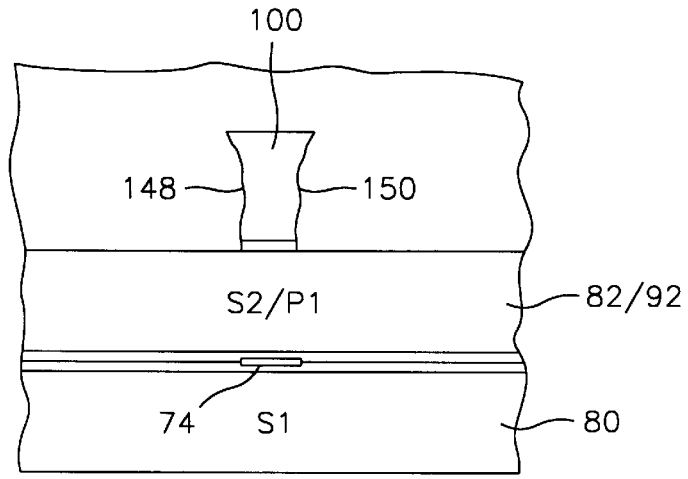
FIG. 11 is a view taken along plane 11—11 of FIG. 9.

When the second pole piece 94 is plated and the photoresist layer 141 is removed the head is complete, as shown in FIG. 9. However, the pole tip 100 is poorly formed, exhibiting irregular side walls 148 and 150, as shown in FIG. 11. Furthermore, photoresist notching results in a second pole tip 100 that has wider areas at the upper pole tip region than at the base of the pole tip (adjacent the write gap). If the irregular second pole tip 100 is used as a milling mask to notch the first pole tip 98, the wider regions of the second pole tip shadows the milling beam. Thus, the milling process is less effective at removing the first pole tip material directly beneath the side walls of the second pole tip. This results in a poorly formed P1 notched write head structure (not shown) due to incomplete notching of the first pole piece 98. These poorly formed pole tips result in side writing of adjacent tracks.

Inverted Magnetic Write Head

Figure 14:
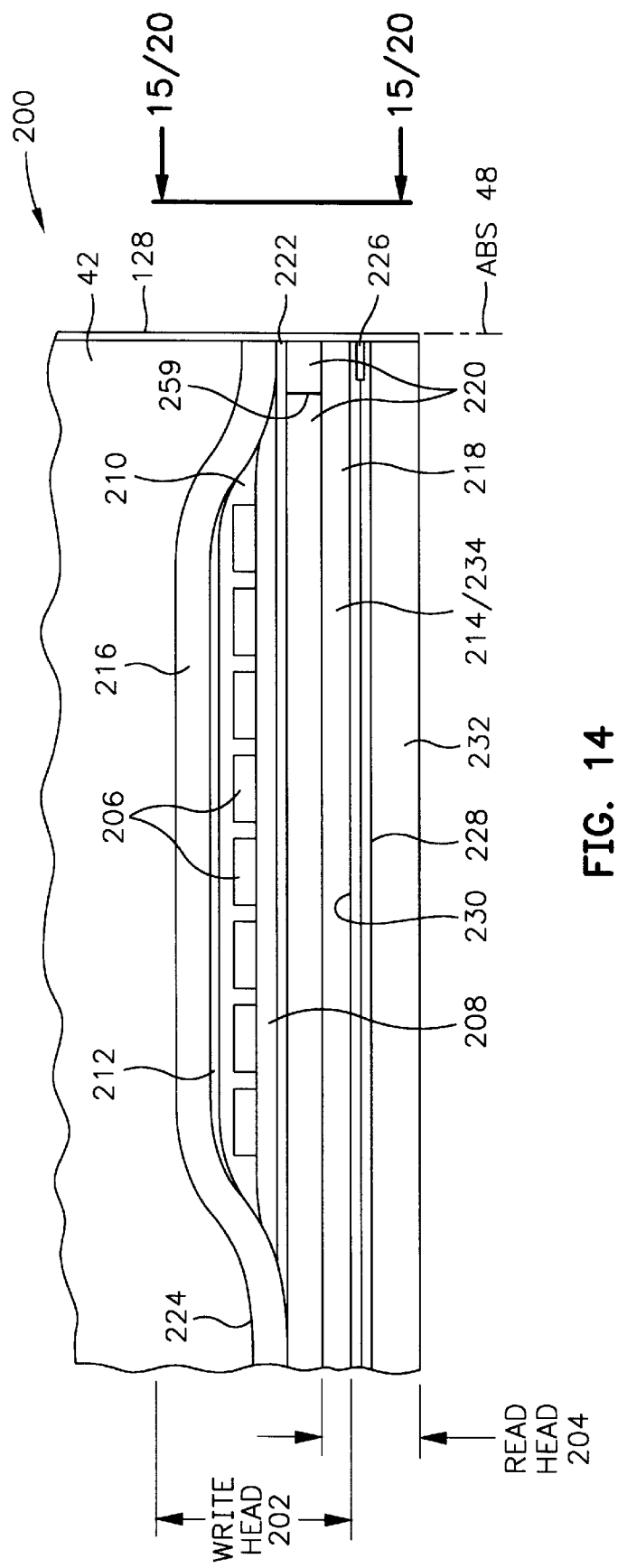
FIG. 14 is a view taken along plane 14—14 of FIG. 2 showing an inverted magnetic write head.

FIG. 14 is a longitudinal cross-sectional illustration of an inverted magnetic write head 200 which has a write head portion 202 and a read head portion 204. The write head portion 202 includes a coil layer 206 that is sandwiched between first and second insulation layers 208 and 210. A third insulation layer 212 may be employed for planarizing the head to eliminate ripples in the second insulation layer caused by the one or more coil layers 206. First, second and third insulation layers are referred to as an "insulation stack". The coil layer 206 and the first, second and third insulation layers 208, 210 and 212 are sandwiched between first and second pole pieces 214 and 216. The first pole piece 214 includes first and second pole piece layers 218 and 220 which will distinguish the inverted write head from the previously described prior art write head, as described in more detail hereinafter. The second layer 220 of the first pole piece is separated from the second pole piece layer 216 by a gap layer 222 at the ABS. The second layer 220 of the first pole piece and the second pole piece layer 216 may be connected at a back gap 224.

A read sensor 226, which may be an anisotropic magnetoresistive (AMR) sensor or a spin valve sensor, is sandwiched between first and second gap layers 228 and 230 which are, in turn, sandwiched between first and second shield layers 232 and 234. In the preferred merged MR head the first pole piece 214 and the first shield layer 234 are a common layer. In an optional piggyback head these are separate layers.

It should be noted from FIG. 14 that edges of each of the MR sensor 226, the first and second layers 218 and 220 of the first pole piece and the second pole piece layer 216 form a portion of the ABS 48. The inverted write head 200 is embedded in the body of the slider 42 as shown in FIG. 2.

Figure 15:
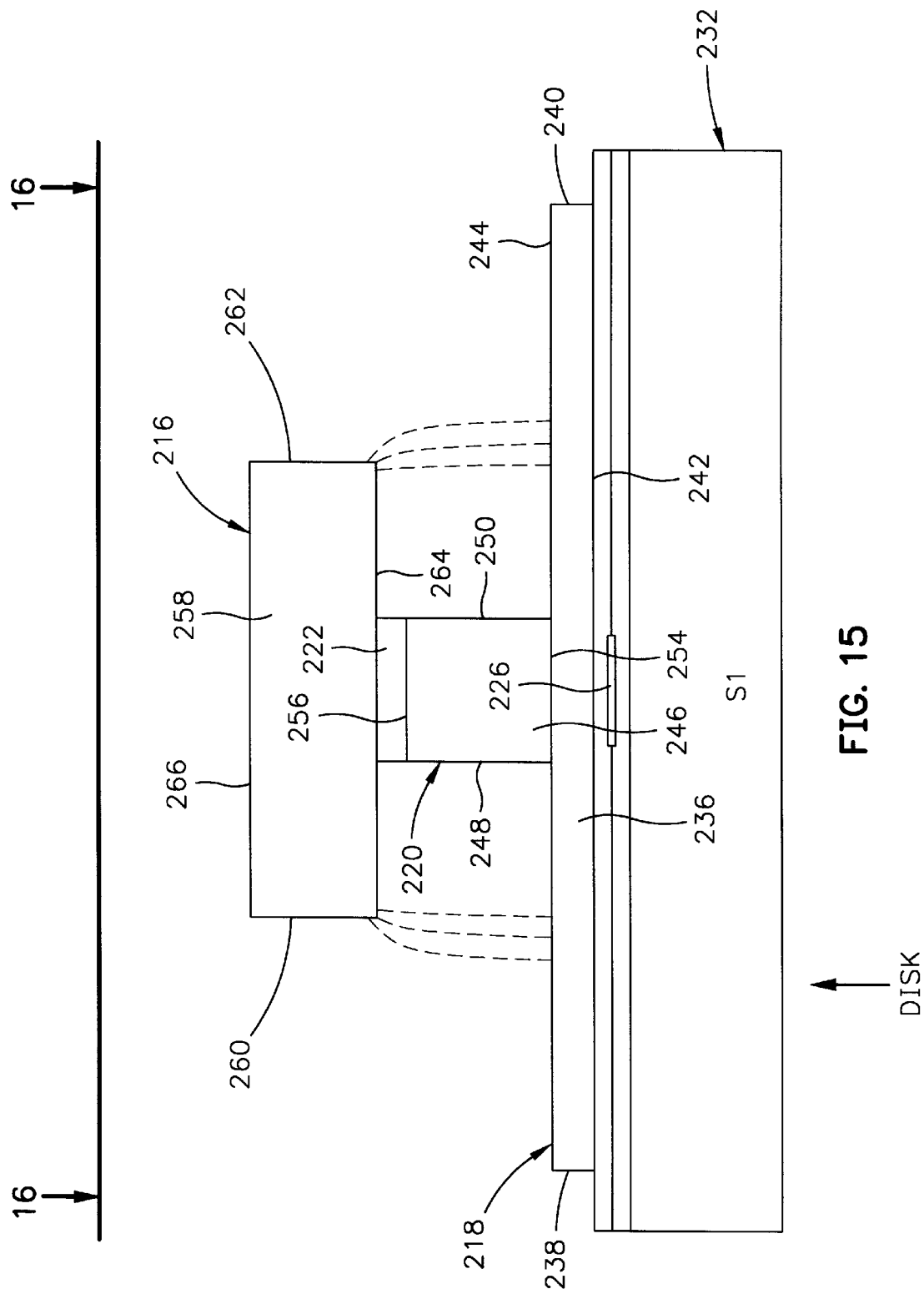
FIG. 15 is a view taken along plane 15—15 of FIG. 14.
Figure 16:
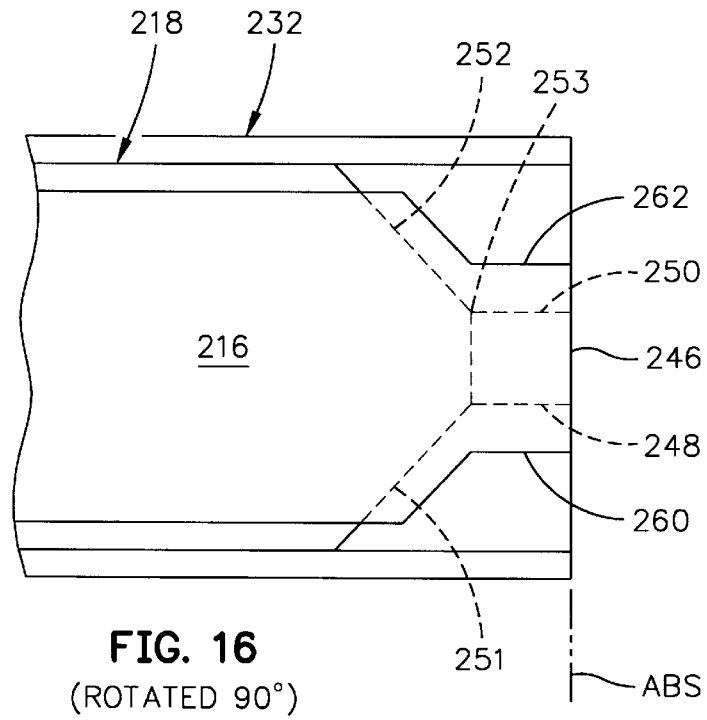
FIG. 16 is a view taken along plane 16—16 of FIG. 15.
Figure 17:
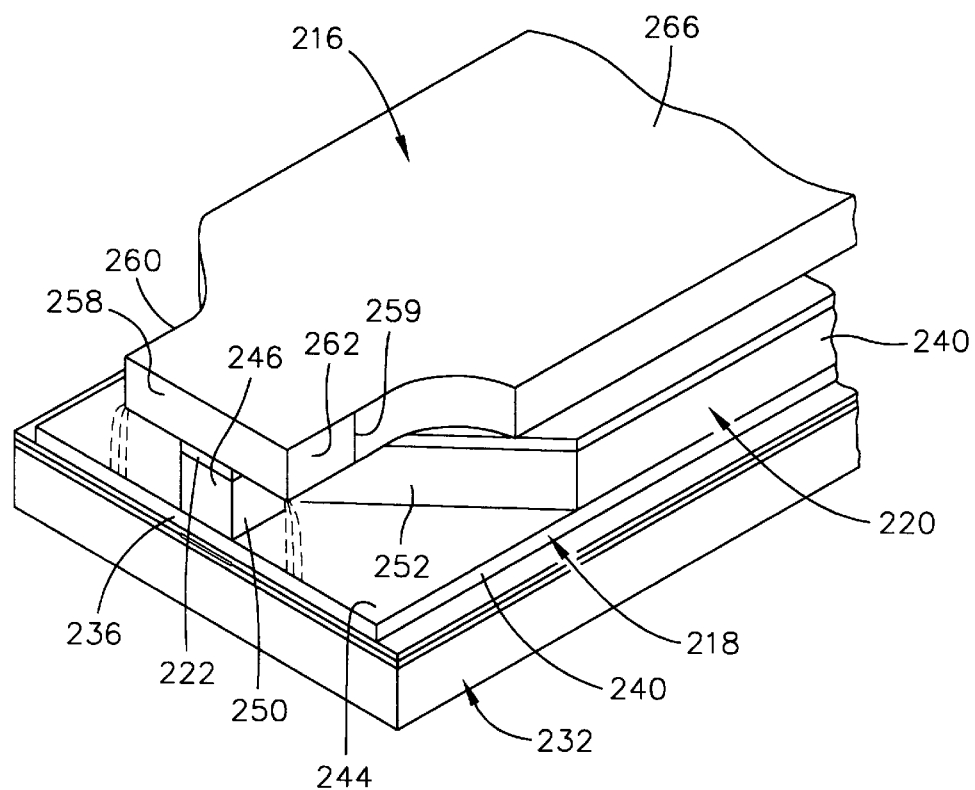
FIG. 17 is an isometric illustration of the inverted write head shown in FIG. 15.

As shown in FIGS. 15–17, the first layer 218 of the first pole piece has an ABS edge 236 which forms a portion of the ABS and first and second side edges 238 and 240. The layer 218 is preferably a flat layer that has first and second surfaces 242 and 244 which are partially bounded by the edges 236, 238 and 240. The second layer 220 of the first pole piece is formed directly on the first layer 218 and has an ABS edge 246 at the ABS and first and second side edges 248 and 250 that are contiguous with tapered side edges 251 and 252 at a flare point 253. The second layer 220 of the first pole piece is preferably a flat layer and has first and second flat surfaces 254 and 256 which are bounded in part by the ABS edge 246, the first and second side edges 248 and 250 and the first and second tapered side edges 251 and 252. The second pole piece layer 216 has an ABS edge 258 and first and second side edges 260 and 262. The second pole piece layer 216 has first and second surfaces 264 and 266, which are partially bounded by the ABS edge 258 and the first and second side edges 260 and 262. As shown in FIGS. 16 and 17, the side edges 260 and 262 of the second pole piece layer form a 90° angle with the ABS edge 258 which produces a problem with the present inverted write head investigated by us, which will be described in more detail hereinafter.

As shown in FIG. 15, the ABS edge 246 of the second layer of the first pole piece is located between the ABS edge 236 of the first layer 218 of the first pole piece and the ABS edge 258 of the second pole piece layer 216. The write gap layer 222 is located between the second surface 256 of the second layer 220 of the first pole piece and the first surface 264 of the second pole piece layer 216. Magnetic field signals fringe across this gap layer 222 between the ABS edges 246 and 258 to write magnetic information signals into a rotating magnetic disk. As shown in FIG. 15, the magnetic disk rotates upwardly from the bottom of the drawing so that the ABS edge 258 of the second pole piece layer 216 is the last pole piece element to pass a written track on the disk. The width of the ABS edge 246 still defines the track width since flux transfer across the gap 222 is confined substantially to the width of the ABS edge 246. The magnetic head is called an inverted write head because the first pole piece defines the track width of the head in contrast to the second pole piece defining the track width of the head in the prior art.

It can be seen from FIG. 14 that the first and second layers 218 and 220 of the first pole piece 214 can be constructed without the reflective notching problem. The first layer 218 of the first pole piece 214 is constructed on the flat layers 228, 230 and 232 and will likewise be flat, as shown in FIG. 14. The second layer 220 of the first pole piece is constructed on the first layer 218 and will be flat. Accordingly, the photoresist used to pattern these layers 218 and 220 will lie flat on the wafer and light will pattern the photoresist layer without any reflective notching. Further, the thickness of the photoresist for patterning is significantly less than the prior art which improves resolution during the light exposure step. Subsequently, the insulation stack, which comprises insulation layers 208, 210 and 212, and one or more coil layers 206 are constructed. When the second pole piece layer 216 is constructed, there may be some reflective notching during the patterning of the second pole piece layer 216. This will be immaterial since the second pole piece layer 216 does not define the track width of the head.

As shown in FIG. 15, the ABS edge 246 of the second layer 220 of the first pole piece has the smallest width at the ABS. The ABS edge 258 of the second pole piece layer 216 has a width that is greater than the ABS edge 246 and the ABS edge 236 of the first layer of the first pole piece has a width that is greater than the ABS edge 258. The large width of the ABS edge 236 is required for shielding the MR sensor 226, and the width of the ABS edge 258 of the second pole piece layer 216 is necessary for flux carrying requirements. It should be noted that the zero throat height (ZTH) of the inverted magnetic head is still located at the separation of the first and second pole pieces 214 and 216 by the insulation stack (insulation layers 208, 210 and 212) and that the flare point will be defined at 259 (FIG. 17) where the second pole piece layer 216 widens as it extends toward the back gap 224.

As shown in FIG. 15, the problem that we found with the present inverted write head investigated by us is that a significant amount of stray flux leaked from the outside corners 260 and 262 of the second pole piece layer 216 to the large lateral expanse of the first layer 218 of the first pole piece. This causes magnetic data tracks on the disk adjacent to the magnetic data track being written to be overwritten by the stray flux from the second layer 220 of the first pole piece. We have overcome this problem by contouring the side edges 260 and 262 of the inverted write head, as shown by the various embodiments of our invention in FIGS. 18–28.

Improved Inverted Magnetic Write Head

Figure 18:
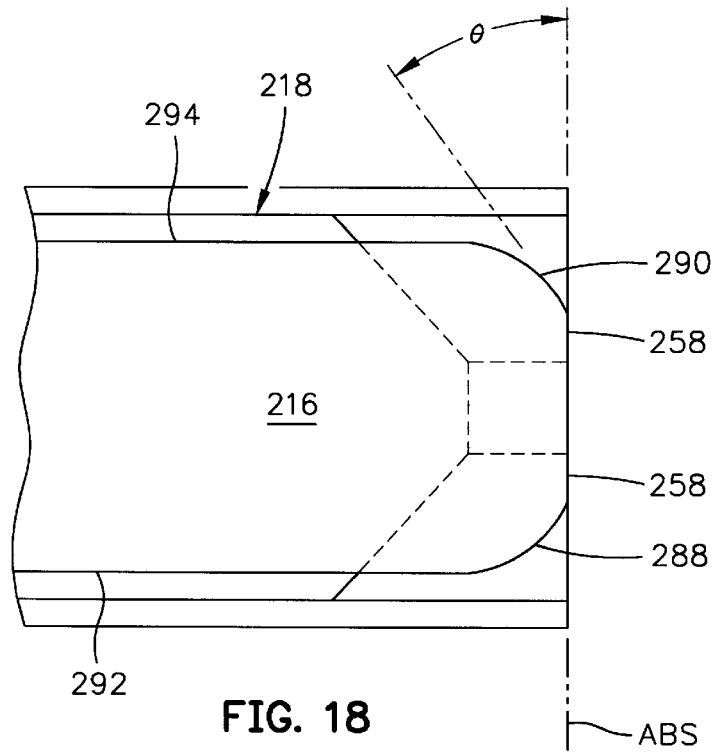
FIG. 18 is a preferred embodiment of the inverted write head of the present invention.
Figure 19:
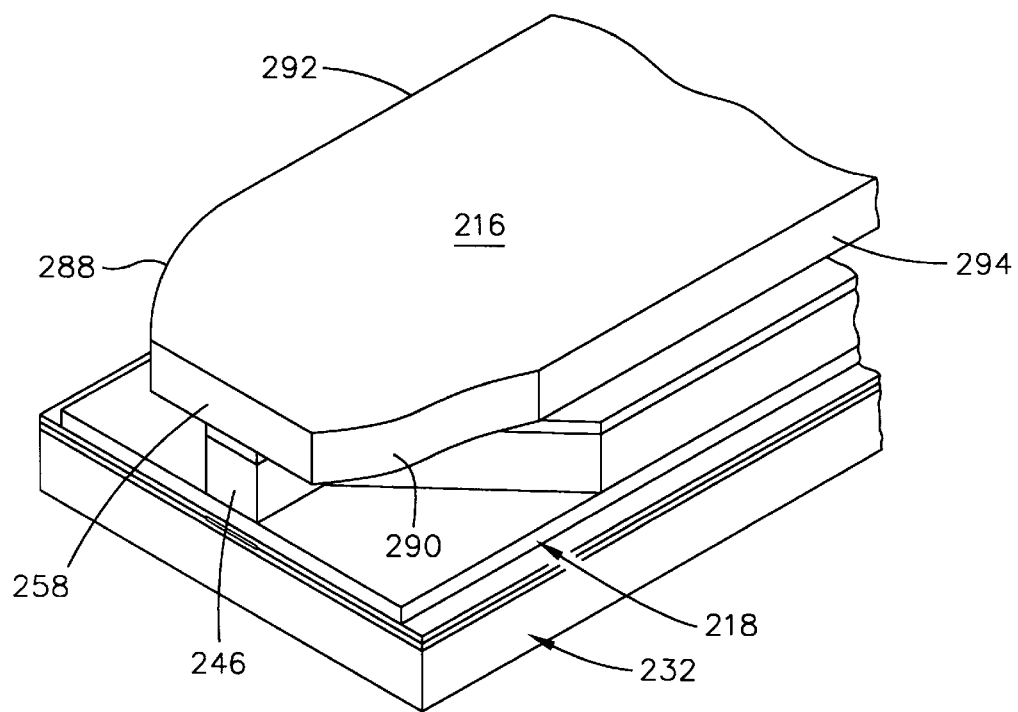
FIG. 19 is an isometric illustration of the write head shown in FIG. 18.

A preferred embodiment of the present invention is shown in FIGS. 18 and 19 wherein the second pole piece layer 216 is provided with first and second rounded edges 288 and 290 which interconnect the ABS edge 258 to the parallel side edges 292 and 294. When the rounded edges 288 and 290 make an angle less than 90° with respect to the ABS edge 258, we have found that there is substantially no leakage from the corners of the ABS edge 258 of the second pole piece 216 to the first layer 218 of the first pole piece. It should be noted that an advantage of this embodiment is that the angle θ made by the ABS edge 258 with each of the rounded side edges 288 and 290 can be quite small. A preferred range is greater than zero to 50°.

Figure 20:
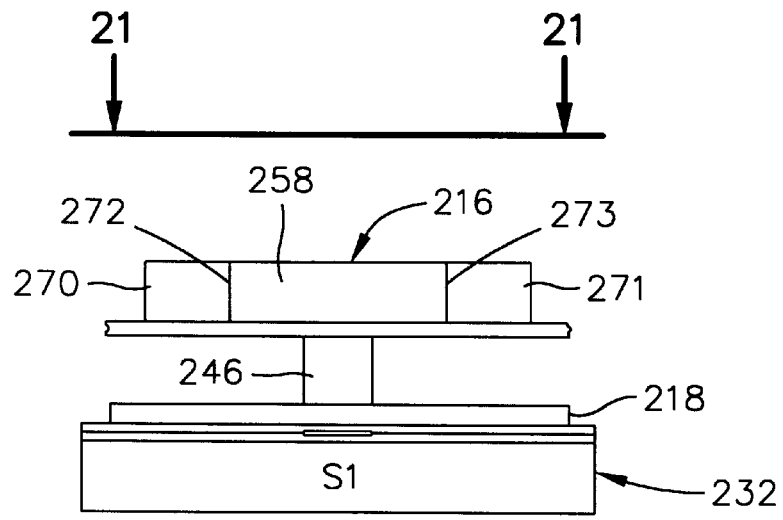
FIG. 20 is a view taken along plane 20—20 of FIG. 14 showing another embodiment of the inverted magnetic write head.
Figure 21:
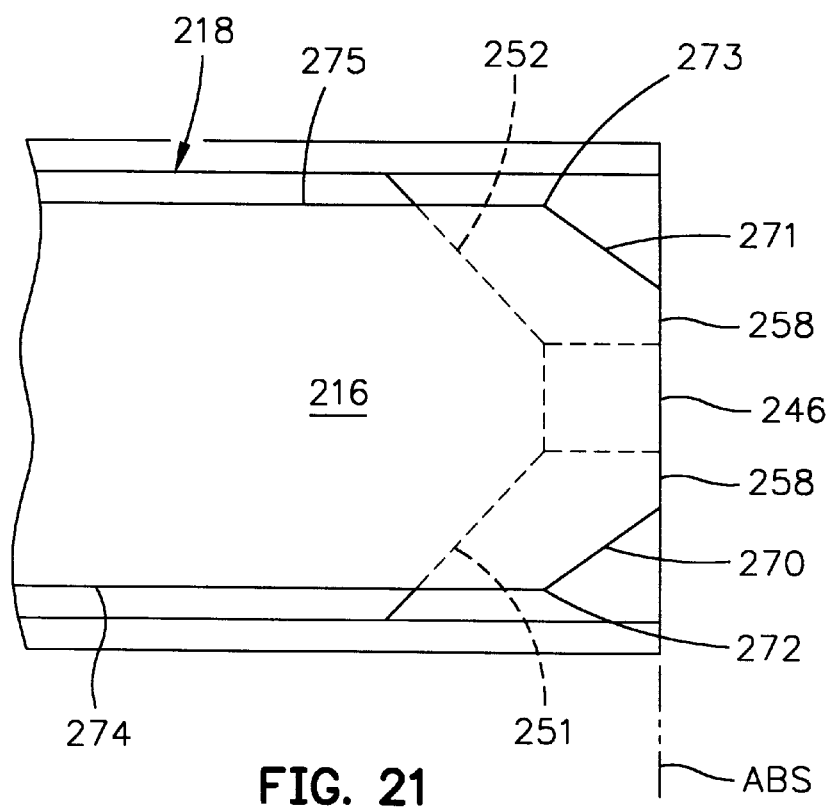
FIG. 21 is a view taken along plane 21—21 of FIG. 20.
Figure 22:
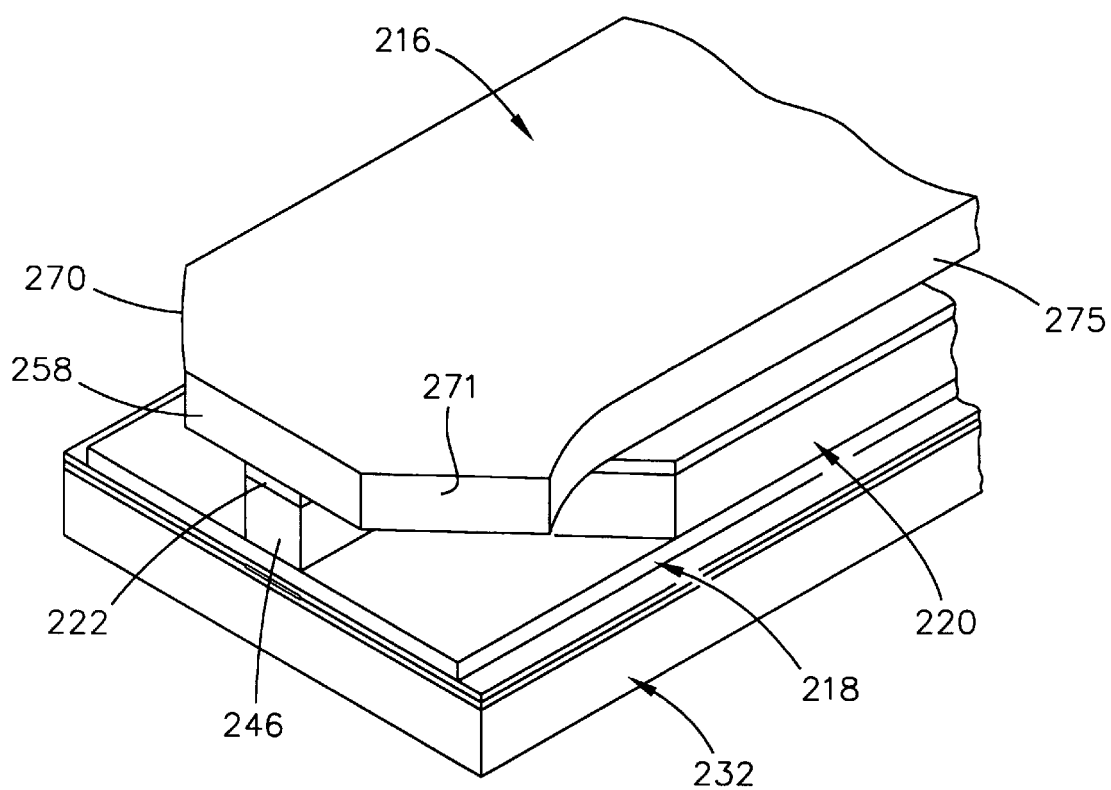
FIG. 22 is an isometric illustration of the magnetic head shown in FIG. 20.

As shown in FIGS. 20–22, another embodiment of our invention provides the second pole piece layer 216 with tapered side edges 270 and 271, each of which makes an angle greater than 90° with respect to the plane of the ABS edge 258. We have found that when the angle between the ABS edge 258 and each of the side edges 270 and 271 is approximately 45° that substantially no flux leaks from the corners 272 and 273 of the second pole piece layer 216 to the first layer 218 of the first pole piece. This is because the amount of flux concentrated (flux density) at the corners 272 and 273 is considerably less than the flux density at the corners 260 and 262 shown in FIG. 15. As shown in FIG. 21, the side edges 270 and 271 may connect to recessed side edges 274 and 275, respectively, which extend toward the back gap 224 (see FIG. 14). Accordingly, the tapered side edges 270 and 271 cause the second pole piece layer 216 to increase in width along its length from the ABS toward the back gap.

Figure 23:
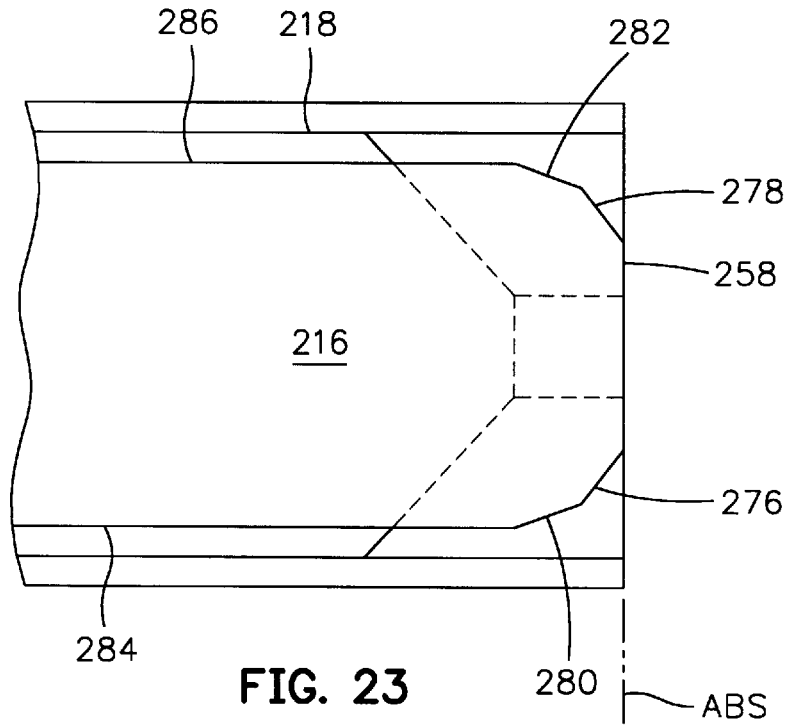
FIG. 23 is a plan view of another embodiment of the inverted write head of the present invention.
Figure 24:
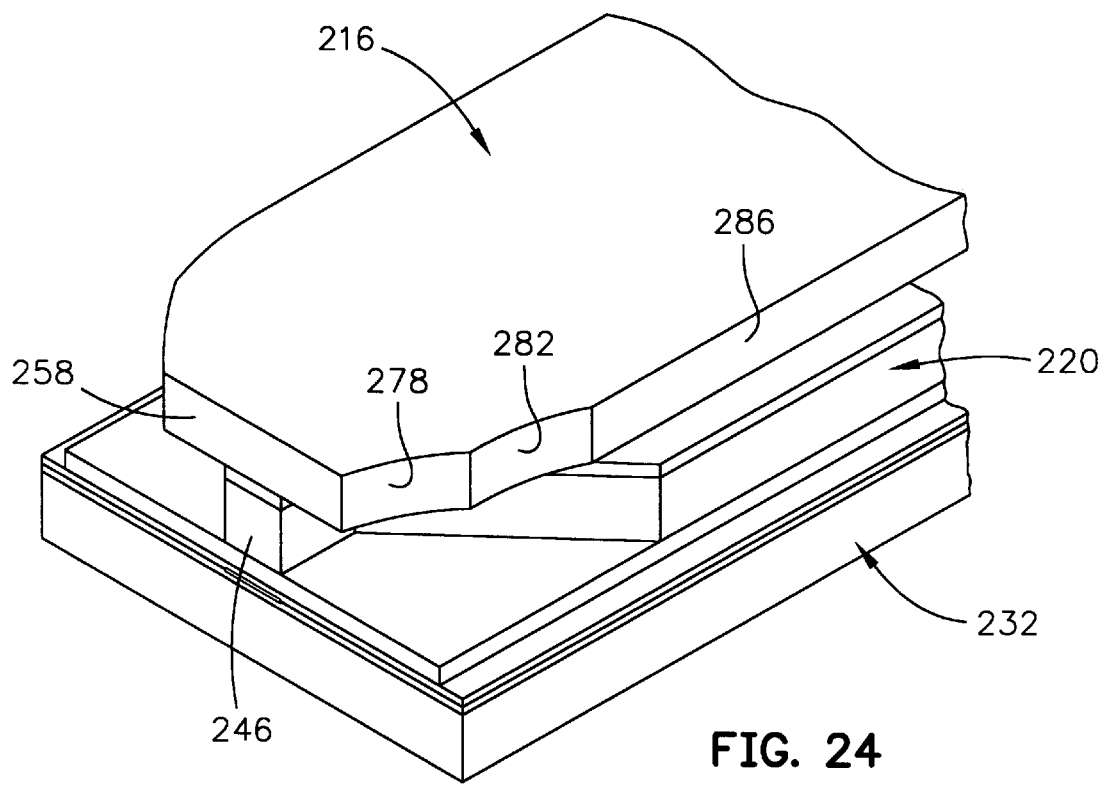
FIG. 24 is an isometric illustration of the magnetic head shown in FIG. 23.

As shown in FIGS. 23 and 24, another embodiment of the invention employs tapered side edges 276 and 278 which make an angle larger than 135° with respect to the ABS edge 258. In this embodiment it is desirable to provide additional tapered edges 280 and 282 which interconnect the tapered edges 276 and 278 to side edges 284 and 286. With this arrangement, the second pole piece layer 216 can be appropriately sized to meet the flux-carrying properties of the write head. When the angle between the tapered side edges 276 and 278 and the ABS edge 258 is large the intermediate tapered edges 280 and 282 provide the desired transition to the larger lateral expansion of the second pole piece layer 216 provided by the side edges 284 and 286.

Figure 25:
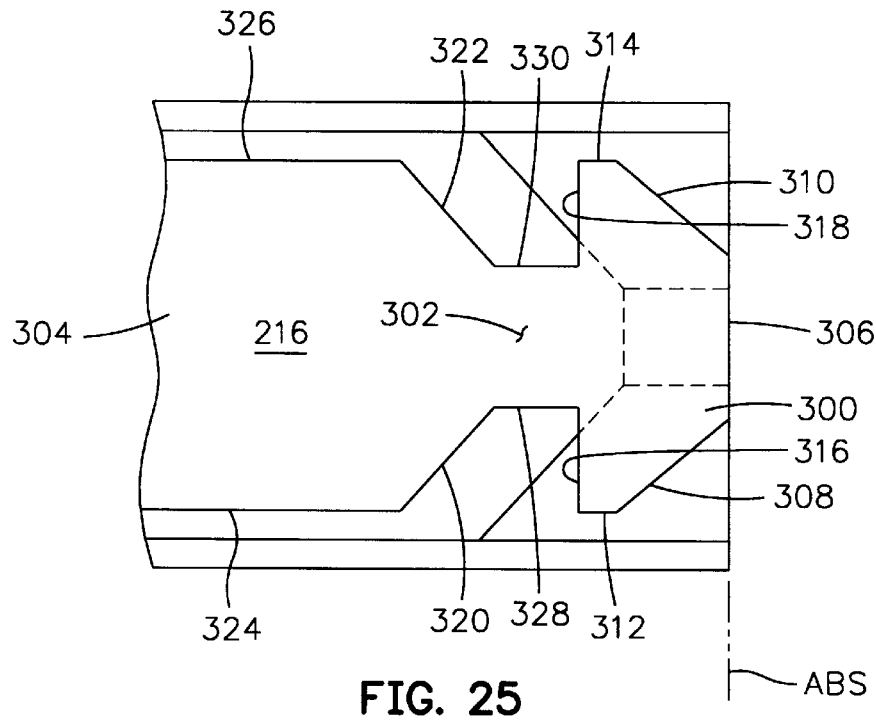
FIG. 25 is a plan illustration of a further embodiment of the inverted write head of the present invention.
Figure 26:
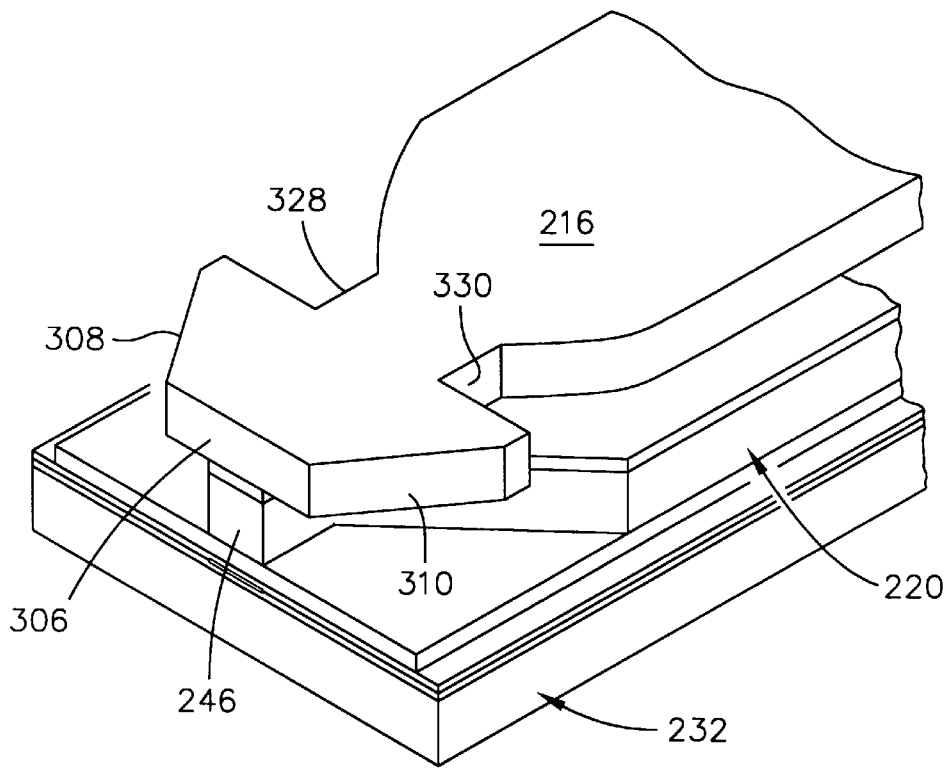
FIG. 26 is an isometric illustration of the inverted write head shown in FIG. 25.

Still another embodiment of the invention is shown in FIGS. 25 and 26, which is referred to as "hammerhead" because of its unique configuration. In this embodiment the second pole piece layer 216 has first, second and third portions 300, 302 and 304. The first portion 300 has an ABS edge 306 and first and second tapered side edges 308 and 310 which make an and with the ABS edge 306 greater than 90°, such as 135°. The first portion 300 may further include parallel side edges 312 and 314 which interconnect the first and second tapered side edges 308 and 310 to back edges 316 and 318 that are substantially parallel to the ABS. The third portion 304 has tapered side edges 320 and 322 which connect with parallel side edges 324 and 326. The parallel side edges 324 and 326 extend toward the back gap. The second portion 302 has parallel side edges 328 and 330 which interconnect the back edges 316 and 318 of the first portion 300 to the tapered side edges 320 and 322 of the third portion 304. The width of the second portion 302 is less than the widths of the first and third portions 300 and 304 and is preferably less than the width of the ABS edge 306. The second portion 302 is, in essence, a neck down portion of the second pole piece layer 216 which is employed for the purpose of restricting the flux from the third portion 304 to the first portion 300 which will be described in more detail hereinafter.

Figure 27:
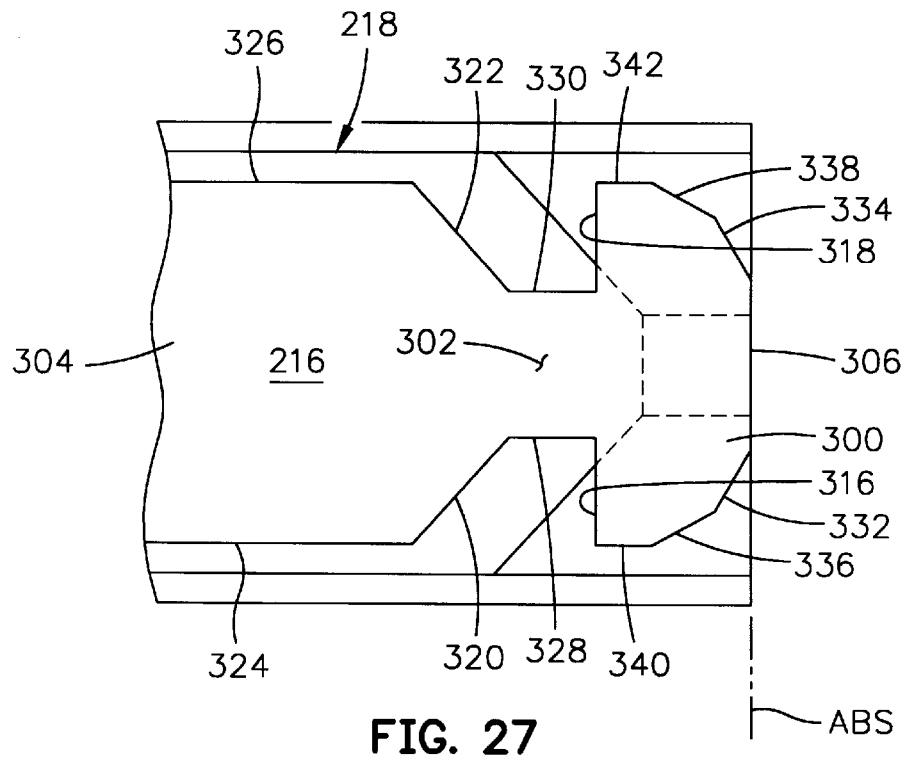
FIG. 27 is a plan illustration of still another inverted write head of the present invention.

Another embodiment of the hammerhead type second pole piece layer 216 is illustrated in FIG. 27. The first portion 300 of this embodiment employs tapered side edges 332 and 334 similar to that as described for the embodiment shown in FIGS. 21 and 22. The first and second tapered side edges 332 and 334 make an angle greater than 90° with respect to the ABS edge 306 and tapered side edges 336 and 338 interconnect the tapered side edges 332 and 334 with parallel side edges 340 and 342, which are contiguous with back edges 316 and 318. Optionally, the side edges 340 and 342 could be omitted and the tapered side edges 336 and 338 may be contiguous with the back edges 316 and 318. This embodiment permits the angle between the tapered side edges 332 and 334 with respect to the ABS edge 306 to be greater than 135°.

Figure 28:
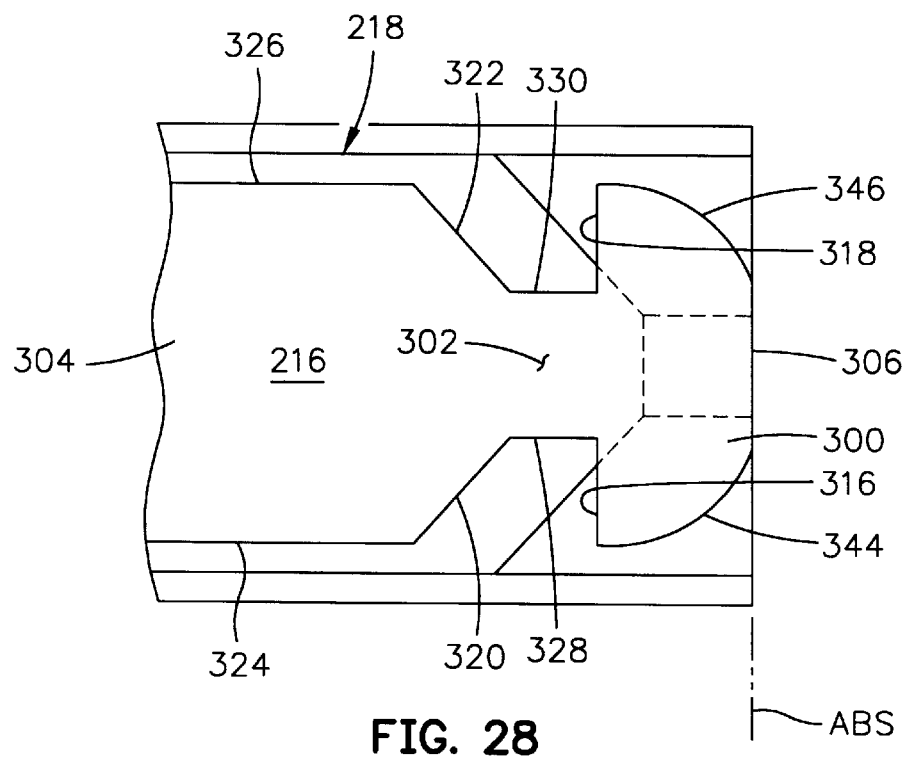
FIG. 28 is a plan view of still another embodiment of the inverted write head of the present invention.

A further embodiment of the hammerhead type second pole piece layer 216 is illustrated in FIG. 28. In this embodiment, the side edges 344 and 346 are rounded and interconnect the ABS edge 306 to the back edges 316 and 318. This embodiment also enables the angle between the rounded side edges 344 and 346 to commence at a large angle slightly less than 180° with respect to the ABS edge 306 so as to ensure no flux leakage between the corners of the ABS edge 306 to the first layer 218 of the first pole piece.

Figure 29:
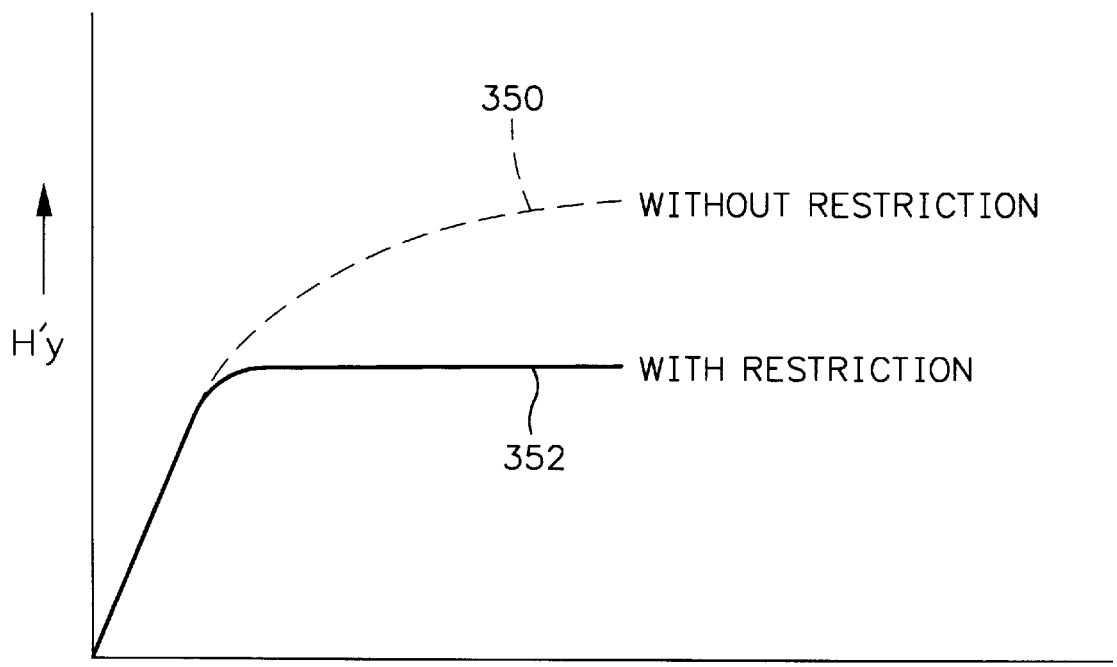
FIG. 29 is a graph showing applied current versus magnetic field at the gap of an inverted write head without the restriction shown in FIGS. 25–28 and with the restriction shown in FIGS. 25–28.
Figure 30:
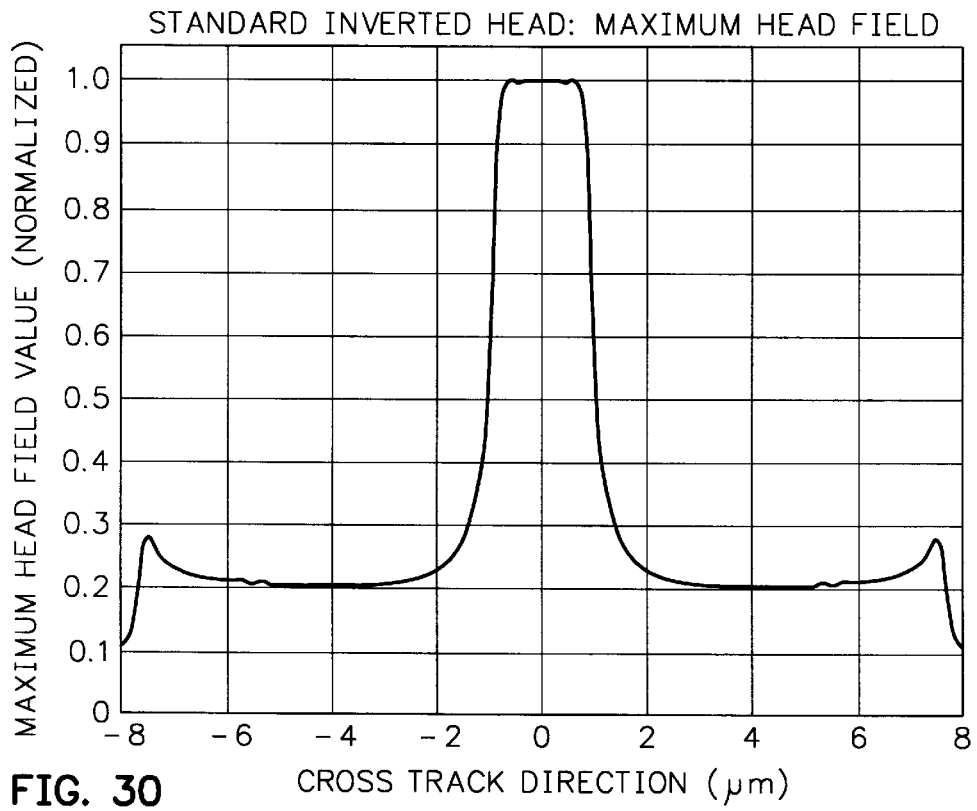
FIG. 30 is a graph showing cross track direction versus field output at the gap of a standard inverted write head without the restriction shown in FIGS. 25–28.
Figure 31:
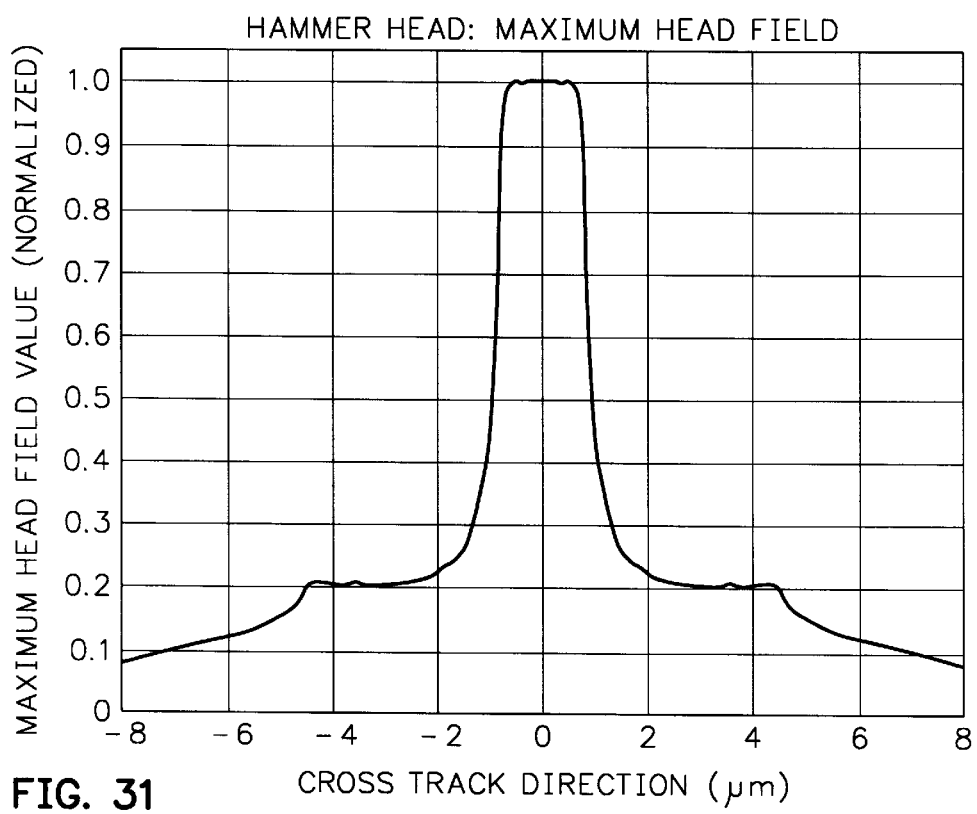
FIG. 31 is a graph showing cross track direction versus magnetic field at the gap of an inverted write head with a restriction as shown in FIGS. 25–28.

FIG. 29 is a graph illustrating current (I) through the coil layer versus field (H'$_y$) at the gap of the write head without any flux restriction at curve 350, as shown in the embodiments in FIGS. 19–23, as compared to the flux restriction at curve 352, shown by the neck down portion 302 in FIGS. 25–28. Accordingly, with the restriction, caused by the neck down portion 302 of the hammerhead type second pole piece layer, the field can be appropriately restricted to prevent saturation of the data writing second layer 220 of the first pole piece. Other tests were done with the standard inverted write head shown in FIGS. 14–17 as compared to the hammerhead type second pole piece layer shown in FIGS. 25–28. FIGS. 30 and 31 show cross track direction in microns versus maximum field at the gap of the head. The graph in FIG. 30 is for the standard inverted head and the graph in FIG. 31 is for the hammerhead type inverted head. As can be seen from FIG. 30, the write field remains at approximately 0.2 Oe to almost 8 µm from the center of the written track whereas in FIG. 31 the field of 0.2 Oe drops significantly when the cross track location of approximately 4.5 µm on each side of the center track is reached. Accordingly, the hammerhead design has improved resolution.

It should be understood that the present invention applies to other "I" shaped pole tip structures in addition to the inverted write head. Other "I" shaped pole tip structures include the "T" portion defining the second pole tip with the write gap being at the bottom of the vertical component of the "T" or the write gap intermediate the vertical component as shown in FIGS. 30 and 5 respectively of commonly assigned U.S. Pat. No. 5,452,164, which patent is incorporated in its entirety by reference herein.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic write head for writing magnetic field information signals on a magnetic disk moving adjacent an air bearing surface (ABS) of the write head, comprising:

first and second pole pieces that are connected at a back gap and that are separated by a gap layer at the ABS;

the first and second pole pieces defining a substantially "I" shaped pole tip structure at the ABS wherein the "I" shaped pole tip structure has top and bottom horizontal components that extend in width across the ABS and are joined by a vertical component;

the top horizontal component being defined by a second pole tip layer that extends from the ABS toward the back gap;

said second pole tip layer defining the top horizontal component and having first and second surfaces that are bounded by an ABS edge and first and second recessed side edges that are each contiguous with the ABS edge and that are recessed from the ABS edge toward the back gap;

each of the first and second surfaces of the second pole tip layer progressively increasing in area from the ABS edge by a function greater than a width of the ABS edge times a length of the second pole tip layer from said ABS toward said back gap;

the second pole tip layer having at least first, second and third layer portions wherein the first layer portion comprises said ABS edge and recesses from the ABS toward said back gap and the second layer portion interconnects the first and third layer portions;

the first layer portion increasing in width from the ABS edge along at least a portion of a length of the first layer portion;

the second layer portion having a reduced width as compared to a width of the first layer portion immediately adjacent the second layer portion; and the third layer portion having an increased width compared to a width of the second layer portion immediately adjacent the third layer portion.

2. A magnetic write head as claimed in claim 1 including:

the second layer portion of the second pole tip layer having a substantially uniform reduced width that is less than the width of the ABS edge.

3. A magnetic write head as claimed in claim 1 wherein each of the first and second recessed side edges of the second pole tip layer is beveled with respect to the ABS edge.

4. A magnetic write head as claimed in claim 3 wherein the second pole tip layer has multiple first and second side edges that are beveled with respect to one another.

5. A magnetic write head as claimed in claim 1 wherein each of the recessed side edges of the second pole tip layer is a rounded edge which commences rounding at the ABS edge.

6. A magnetic write head as claimed in claim 1 including:

an insulation stack and at least one coil layer;

the coil layer being embedded in the insulation stack;

each of the first and second pole pieces having a pole tip region and a yoke region, the pole tip region extending from the ABS to the yoke region and the yoke region extending from the yoke region to the back gap;

the insulation stack being sandwiched between the first and second pole pieces in the yoke regions of the first and second pole pieces;

the first pole piece having first and second layers;

the second layer of the first pole piece being a pedestal that is located only in the pole tip region of the first pole piece layer; and the first layer of the first pole piece extending from the ABS to the back gap.

7. A magnetic write head as claimed in claim 6 wherein:

the first and second layers define the bottom horizontal component and the vertical component respectively of the "I" shaped pole tip structure; and each of the first and second layers being flat.

8. A magnetic write head as claimed in claim 7 wherein each of the first and second recessed side edges of the second pole tip layer is beveled with respect to the ABS edge.

9. A magnetic write head as claimed in claim 8 wherein the second pole tip layer has multiple first and second side edges that are beveled with respect to one another.

10. A magnetic write head as claimed in claim 7 wherein each of the recessed side edges of the second pole tip layer is a rounded edge which commences rounding at the ABS edge.

11. A merged magnetoresistive (MR) head for writing and reading magnetic field information signals on a magnetic disk moving adjacent an air bearing surface (ABS) of the head, comprising:
a write head, comprising:
first and second pole pieces that are connected at a back gap and that are separated by a gap layer at the ABS;
the first and second pole pieces defining a substantially "I" shaped pole tip structure at the ABS wherein the "I" shaped pole tip structure has top and bottom horizontal components that extend in width across the ABS and are joined by a vertical component;
the top horizontal component being defined by a second pole tip layer that extends from the ABS toward the back gap;
said second pole tip layer having first and second surfaces that are bounded by an ABS edge and first and second recessed side edges that are each contiguous with the ABS edge and that are recessed from the ABS edge toward the back gap;
each of the first and second surfaces of the second pole tip layer progressively increasing in area from the ABS edge by a function greater than a width of the ABS edge times a length of the second pole tip layer from said ABS toward said back gap;
the second pole tip layer having at least first, second and third layer portions wherein the first layer portion comprises said ABS edge and recesses from the ABS toward said back gap and the second layer portion interconnects the first and third layer portions;
the first layer portion increasing in width from the ABS edge along at least a portion of a length of the first layer portion;
the second layer portion having a reduced width as compared to a width of the first layer portion immediately adjacent the second layer portion; and
the third layer portion having an increased width compared to a width of the second layer portion immediately adjacent the third layer portion;
a read head including:
an MR sensor and first and second gap layers;
the MR sensor being sandwiched between the first and second gap layers;
first and second ferromagnetic shield layers; and
the first and second gap layers being sandwiched between the first and second shield layers; and
the second shield layer and the first pole piece layer being a common layer.

12. A merged magnetoresistive head as claimed in claim 11 including:
an insulation stack and at least one coil layer;
the coil layer being embedded in the insulation stack;
each of the first and second pole pieces having a pole tip region and a yoke region, the pole tip region extending from the ABS to the yoke region and the yoke region extending from the yoke region to the back gap; and
the insulation stack being sandwiched between the first and second pole pieces in the yoke regions of the first and second pole pieces.

13. A merged magnetoresistive head as claimed in claim 12 including:
the first pole piece having first and second layers that define the bottom horizontal component and the vertical component respectively of the "I" shaped pole tip structure; and
each of the first and second layers being flat.

14. A merged magnetoresistive head as claimed in claim 13 wherein each of the first and second recessed side edges of the second pole tip layer is beveled with respect to the ABS edge.

15. A merged magnetoresistive head as claimed in claim 14 wherein the second pole tip layer has multiple first and second side edges that are beveled with respect to one another.

16. A merged magnetoresistive head as claimed in claim 13 wherein each of the recessed side edges of the second pole tip layer is a rounded edge which commences rounding at the ABS edge.

17. A magnetic disk drive comprising:
a combined magnetic write and read head for writing and reading magnetic field information signals on a magnetic disk moving adjacent an air bearing surface (ABS) of the combined head;
the write head including:
first and second pole pieces that are connected at a back gap and that are separated by a gap layer at the ABS;
the first and second pole pieces defining a substantially "I" shaped pole tip structure at the ABS wherein the "I" shaped pole tip structure has top and bottom horizontal components that extend in width across the ABS and are joined by a vertical component;
the top horizontal component being defined by a second pole tip layer that extends from the ABS toward the back gap;
said second pole tip layer having first and second surfaces that are bounded by an ABS edge and first and second recessed side edges that are each contiguous with the ABS edge and that are recessed from the ABS edge toward the back gap;
each of the first and second surfaces of the second pole tip layer progressively increasing in area from the ABS edge by a function greater than a width of the ABS edge times a length of the second pole tip layer from said ABS toward said back gap;
the second pole tip layer having at least first, second and third layer portions wherein the first layer portion comprises said ABS edge and recesses from the ABS toward said back gap and the second layer portion interconnects the first and third layer portions;
the first layer portion increasing in width from the ABS edge along at least a portion of a length of the first layer portion;
the second layer portion having a reduced width as compared to a width of the first layer portion immediately adjacent the second layer portion; and
the third layer portion having an increased width compared to a width of the second layer portion immediately adjacent the third layer portion;
a read head including:
a magnetoresistive (MR) sensor layer, first and second lead layers, first and second nonmagnetic gap layers and first and second ferromagnetic shield layers;
the first and second lead layers being connected to the MR sensor layer; and
the MR sensor layer and the first and second lead layers being sandwiched between the first and second gap layers and the first and second gap layers being sandwiched between the first and second shield layers;
a frame;
a magnetic disk rotatably supported on the frame;
a support mounted on the frame for supporting the head in a transducing relationship with the magnetic disk;
means for rotating the magnetic disk;
positioning means connected to the support for moving the combined magnetic head to multiple positions with respect to said magnetic disk; and means connected to the combined magnetic head, to the means for rotating the magnetic disk and to the positioning means for exchanging signals with the combined magnetic head, for controlling movement of the magnetic disk and for controlling the position of the combined magnetic head.

18. A magnetic disk drive as claimed in claim 17 including:

an insulation stack and at least one coil layer;

the coil layer being embedded in the insulation stack;

each of the first and second pole pieces having a pole tip region and a yoke region, the pole tip region extending from the ABS to the yoke region and the yoke region extending from the yoke region to the back gap; and the insulation stack being sandwiched between the first and second pole pieces in the yoke regions of the first and second pole pieces.

19. A magnetic disk drive as claimed in claim 18 including:

the first pole piece having first and second layers that define the bottom horizontal component and the vertical component respectively of the "I" shaped pole tip structure; and each of the first and second layers being flat.

20. A magnetic disk drive as claimed in claim 19 wherein each of the first and second recessed side edges of the second pole tip layer is beveled with respect to the ABS edge.

21. A magnetic disk drive as claimed in claim 20 wherein the second pole tip layer has multiple first and second side edges that are beveled with respect to one another.

22. A magnetic disk drive as claimed in claim 19 wherein each of the recessed side edges of the second pole tip layer is a rounded edge which commences rounding at the ABS edge.

23. A method of making a magnetic write head for writing magnetic field information signals on a magnetic disk moving adjacent an air bearing surface (ABS) of the write head, comprising:

forming first and second pole pieces that are connected at a back gap and that are separated by a gap layer at the ABS;

forming the first and second pole pieces with a substantially "I" shaped pole tip structure at the ABS wherein the "I" shaped pole tip structure has top and bottom horizontal components that extend in width across the ABS and are joined by a vertical component;

forming the top horizontal component with a second pole tip layer that extends from the ABS toward the back gap;

forming said second pole tip layer that has first and second surfaces that are bounded by an ABS edge and first and second recessed side edges that are each contiguous with the ABS edge and that are recessed from the ABS edge toward the back gap;

forming each of the first and second surfaces of the second pole tip layer with progressively increasing areas from the ABS edge by a function greater than a width of the ABS edge times a length of the second pole tip layer from said ABS toward said back gap;

forming the second pole tip layer with at least first, second and third layer portions wherein the first layer portion comprises said ABS edge and recesses from the ABS toward said back gap and the second layer portion interconnects the first and third layer portions;

forming the first layer portion with an increasing width from the ABS edge along at least a portion of a length of the first layer portion;

forming the second layer portion with a reduced width as compared to a width of the first layer portion immediately adjacent the second layer portion; and forming the third layer portion with an increased width compared to a width of the second layer portion immediately adjacent the third layer portion.

24. A method as claimed in claim 23 including:

forming the second layer portion of the second pole tip layer with a substantially uniform reduced width that is less than the width of the ABS edge.

25. A method as claimed in claim 23 including:

forming each of the recessed side edges of the second pole tip layer with a beveled edge with respect to the ABS edge.

26. A method as claimed in claim 25 including:

forming the second pole tip layer with multiple first and second side edges that are beveled with respect to one another.

27. A method as claimed in claim 23 including:

forming each of the recessed side edges of the second pole tip layer with a rounded edge which commences rounding at the ABS edge.

28. A method as claimed in claim 23 including:

forming an insulation stack and at least one coil layer;

embedding the coil layer in the insulation stack;

forming each of the first and second pole pieces with a pole tip region and a yoke region, the pole tip region extending from the ABS to the yoke region and the yoke region extending from the yoke region to the back gap; and sandwiching the insulation stack between the first and second pole pieces in the yoke regions of the first and second pole pieces.

29. A method as claimed in claim 28 including:

forming the first pole piece with first and second layers that define the bottom horizontal component and vertical component respectively of the "I" shaped pole tip structure; and forming each of the first and second layers flat.

30. A method as claimed in claim 29 including:

forming each of the recessed side edges of the second pole tip layer with a beveled edge with respect to the ABS edge.

31. A method as claimed in claim 30 including:

forming the second pole tip layer with multiple first and second side edges that are beveled with respect to one another.

32. A method as claimed in claim 29 including:

forming each of the recessed side edges of the second pole tip layer with a rounded edge which commences rounding at the ABS edge of the second pole piece layer.

* * * * *